(12) United States Patent
Diamant et al.

(10) Patent No.: US 6,202,153 B1
(45) Date of Patent: Mar. 13, 2001

(54) SECURITY SWITCHING DEVICE

(75) Inventors: Erez Diamant, Herzlia; Amir Prescher; Nir Brachel, both of Ramat Gan; Lior Netzer, Tel Aviv, all of (IL)

(73) Assignee: Voltaire Advanced Data Security Ltd., Herzelia (IL)

( * ) Notice: Subject to any disclaimer, the term of this patent is extended or adjusted under 35 U.S.C. 154(b) by 0 days.

(21) Appl. No.: 09/025,221

(22) Filed: Feb. 18, 1998

Related U.S. Application Data

(63) Continuation-in-part of application No. 08/941,158, filed on Sep. 30, 1997, which is a continuation-in-part of application No. 08/804,972, filed on Feb. 20, 1997, which is a continuation-in-part of application No. 08/754,871, filed on Nov. 22, 1996.

(51) Int. Cl.[7] .................................................. G06F 11/00
(52) U.S. Cl. ............................................. 713/200; 380/49
(58) Field of Search .................................. 713/200, 201, 713/202; 714/4, 18, 37, 39, 43, 48; 380/23, 25, 4, 49; 379/211, 267, 269; 364/286.4, 286.5; 382/118, 119

(56) References Cited

U.S. PATENT DOCUMENTS

| | | | |
|---|---|---|---|
| 4,498,716 | * 2/1985 | Ward | 339/17 R |
| 4,769,833 | * 9/1988 | Farleigh et al. | 379/105 |
| 4,799,153 | * 1/1989 | Hann et al. | 364/200 |
| 4,975,950 | 12/1990 | Lentz | 380/4 |
| 5,128,995 | 7/1992 | Arnold et al. | 380/4 |
| 5,144,659 | 9/1992 | Jones | 380/4 |
| 5,144,660 | 9/1992 | Rose | 380/4 |
| 5,191,583 | * 3/1993 | Pearson et al. | 370/94.1 |
| 5,202,997 | 4/1993 | Arato | 395/725 |
| 5,268,960 | 12/1993 | Hung et al. | 380/4 |
| 5,289,540 | 2/1994 | Jones | 380/4 |
| 5,317,746 | 5/1994 | Watanabe | 395/700 |
| 5,343,525 | 8/1994 | Hung et al. | 380/4 |
| 5,355,489 | 10/1994 | Bealkowski et al. | 395/700 |
| 5,361,359 | 11/1994 | Tajalli et al. | 395/700 |
| 5,384,854 | * 1/1995 | Downs et al. | 381/81 |
| 5,414,844 | 5/1995 | Wang | 395/650 |
| 5,434,562 | 7/1995 | Reardon | 340/825.34 |
| 5,463,632 | * 10/1995 | Tremblay | 371/20.1 |
| 5,475,839 | 12/1995 | Watson et al. | 395/650 |
| 5,499,334 | 3/1996 | Staab | 395/157 |
| 5,509,120 | 4/1996 | Merkin et al. | 395/186 |
| 5,530,455 | 6/1996 | Gillick et al. | 345/163 |
| 5,537,540 | 7/1996 | Miller et al. | 395/183.14 |
| 5,559,883 | 9/1996 | Williams | 380/4 |
| 5,564,002 | 10/1996 | Brown | 395/155 |
| 5,570,367 | * 10/1996 | Ayanoglu et al. | 370/94.1 |
| 5,778,443 | 7/1998 | Swanberg et al. | 711/162 |
| 5,815,571 | * 9/1998 | Finley | 380/4 |
| 5,896,499 | * 4/1999 | McKelvey | 395/187.01 |
| 5,909,586 | * 6/1999 | Anderson | 395/750.08 |
| 5,913,037 | * 6/1999 | Spofford et al. | 395/200.56 |
| 5,923,757 | * 7/1999 | Hocker et al. | 380/21 |

OTHER PUBLICATIONS

Microsoft Power Point Tools, Chapter 12, p.443, Library of Congress Catalog Card No. 934–70074.

* cited by examiner

Primary Examiner—Nadeem Iqbal
(74) Attorney, Agent, or Firm—Darby & Darby

(57) ABSTRACT

Method for selectively connecting computer stations to a plurality of communication devices, including the steps of receiving a connection request from a computer station to connect to a requested one of said plurality of communication devices, disconnecting the selected computer station from all of the communication devices, detecting if the selected computer station is configured according to the requested communication device, and connecting the selected computer station to the requested communication device, when the selected computer station is configured according to the requested communication device.

15 Claims, 25 Drawing Sheets

SECURITY SWITCHING DEVICE

CROSS-REFERENCE TO PREVIOUS APPLICATIONS

This application is a continuation-in-part of a co-pending application entitled U.S. Ser. No. 08/941,158, filed Sep. 30, 1997, which is a continuation-in-part of U.S. Ser. No. 08/804,972 filed Feb. 20, 1997, which is a continuation-in-part of U.S. Ser. No. 08/754,871 filed Nov. 22, 1996.

FIELD OF THE INVENTION

The present invention relates to methods and systems for securing information during communication.

BACKGROUND OF THE INVENTION

Method for securing information are known in art. Conventional methods are based on encryption wherein secured data is processed according to a predetermined encryption method or key to provide an encrypted file. Decoding the encrypted file, back to the original information requires processing the encrypted file backwards according to the encryption method or key.

Computers which are connected to WAN or LAN communication networks are vulnerable to hostile intrusion by unauthorized persons or data viruses which attempt to access classified files, download them and "crack" their encryption.

The problem is significantly enhanced for portable computers, which are also liable to be stolen along with the information contained therein.

Another major problem relates to securing access to data and devices when in communication over a network. Unauthorized network users may attempt to penetrate the secured system or try to send damaging software, such as software viruses. Prior art software systems such as fire-walls and the like, do not provide a full proof solution against such unauthorized attempts.

Another major problem relates to securing an organization's networks and computers against virus programs. A number of products currently provide on-line scanning of incoming communication to identify damaging software such as viruses (such as WebShield of Finjan Software Ltd. of Netania, Israel, PCFireWall and WebScan of McCafee Inc. of Santa Clara Calif.). It will be appreciated that scanning all incoming data and data changes during communication consumes a great deal of resources and is generally not performed at a full scale in real time.

U.S. Pat. No. 5,434,562 to David C. Reardon describes a manually user operable switch for securing a device such as a hard disk from unauthorized access from a network.

In computer systems, it is common to implement an audit log, to record security related activities in the system. In this case, the recorded log itself needs to be secured against future alteration, which will deceive the auditor to trust a forged record.

It will be appreciated that an effective security log needs to be written on a media which cannot be altered. A common method is to print the log on hard copy. While hard copy is difficult to alter, it is also more difficult to duplicate, process and communicate in a computerized environment.

Another method is to write the log on a Write Once Read Many media (such as Pinnacle RCD-1000, Pinnacle Micro Corporation). It will be appreciated that in practice Write Once Read Many data storage solutions are inferior to common read-write technologies (such as magnetic hard disks) in both performance and reliability. Furthermore, the installation of a Write Once device for the sole purpose of recording a log involves significant costs.

Special software applications are able to detect attempts of such hostile intrusion to computer resources by unauthorized persons or data viruses. In this case, the computer has to be restarted (boot operation) from a "clean media" which is often called a rescue diskette, since the hard drives of the computer are suspected to be contaminated. This clean media often includes removable media such as a diskette or a CD-ROM.

Methods for remotely connecting stations to devices are known in the art. It will be appreciated that in order to connect to a specified device, a user is usually required to provide access information, which includes one or more predetermined sequences, such as identification number, password and the like. Accordingly, the receiving device does not require any other information other than the access information.

The connecting or disconnecting of a station to a selected device is basically performed by a relay, electro-mechanical or electronic, at the remote switching device.

SUMMARY OF THE PRESENT INVENTION

It is an object of the present invention to provide a novel switching device for securely connecting a plurality of computer stations to a plurality of peripheral devises, which overcomes the disadvantages of the prior art.

It is a further object of the present invention to provide a novel method for securely connecting a plurality of computer stations to a plurality of peripheral devises.

There is thus provided in accordance with the present invention a system which includes a switching element for each of the computer stations connected thereto and further connected to at least two of the communication devices, a filter, connected to the switching element and a communication interface connected between the computer station and the filter.

The communication interface receives a connection request from the computer station, to connect to a requested one of the selected communication devices and provides a connection command to the filter, when the selected computer station is configured according to the connection request.

The filter provides the connection command to the switching element which connects the requested communication device to the selected computer station.

Furthermore, the filter and the communication interface provide data communication between the requested communication device and the computer station.

According to one aspect of the invention, the switching element disconnects the computer station from any communication device, before the connecting to the requested communication device.

According to another aspect of the present invention, there is provided a system for securely connecting at least one computer station to a plurality of communication devices. The system includes a switching element for each selected one of the computer stations, connected thereto. The switching element is further connected to at least two selected ones of the communication devices and a controller, connected to the switching element and the selected computer station.

The controller receives a connection request from the computer station, to connect to a requested one of the selected communication devices. The controller provides the connection command to the switching element, when the selected computer station is configured according to the connection request. Accordingly, the switching element connects the requested communication device to the selected computer station.

In accordance with another aspect of the present invention, there is thus provided a system for securely connecting a predetermined number of computer stations to a predetermined number of communication devices, via a predetermined number of communication lines. The number of communication lines is less than any one of the predetermined number of computer stations and the predetermined number of communication devices.

The system includes a remote switching device, connected to the communication devices, and a local switching device, connected to the computer stations. The remote switching device and the local switching device are connected therebetween via the communication lines.

The local switching device receives a connection request from one of the computer stations and connects the one of the computer stations to the remote switching device, via an available one of the communication lines.

The remote switching element further connects the available one of the communication lines to the requested communication device.

The local switching device can further connect the computer station to the remote switching device, via an available one of the communication lines, only when the computer station is configured according to the connect ion request.

The communication devices are generally peripheral devices and connections such as a printer, a network interface, a scanner, a modem, a switch, a hub, a router, a computer peripheral device, a server and the like.

The switching element is basically any element which can alternately connect between devices, such as a relay, a packet switch, a frequency based switch, a code switch, an optical switch, an analog switch, a biological switch, a digital switch, a solid state switch and the like.

Basically, the profile of each peripheral device defines a configuration for the computer station requesting connection thereto. The requesting computer station has to be configured according to this configuration before connecting to the requested communication device.

In accordance with a further aspect of the invention, there is thus provided a method for selectively connecting at least one computer station to at a plurality of communication devices. The method including the steps of:

receiving a connection request from a selected computer station, to connect to a requested one of the plurality of communication devices, detecting if the selected computer station is configured according to the requested communication device, connecting the selected computer station to the requested communication device, when the selected computer station is configured according to the requested communication device.

The method can further include the step of disconnecting the selected computer station from all of the communication devices, before the step of connecting.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention includes several aspects which define novel principles for transmitting and storing data in a multiple computer system.

According to one aspect of the invention, secured areas and public areas are physically separated. Thus, a network system according to the invention shall include at least two communication networks wherein at least one of these networks is defined as a secured network, whereby confidential information is generally transmitted via the secured area. There is no direct connection between the public network and the secured network.

According to another aspect of the invention, confidential transmissions are physically divided into at least two elements wherein at least a predetermined one of them is required to reconstruct the original transmission. This predetermined element is transmitted via a secured network and stored in a secured storage area, both of which can be physically disconnected from a main channel of communication.

According to a first implementation of the invention, the first element includes a portion of the classified data and the second element includes a complementary element of the classified data.

According to a second implementation of the invention, the first element includes the classified data in an encrypted form and the second element includes the encryption-decryption software.

According to a third implementation of the invention, the first element includes the classified data in an encrypted form and the second element includes the encryption-decryption key.

Figure 1:
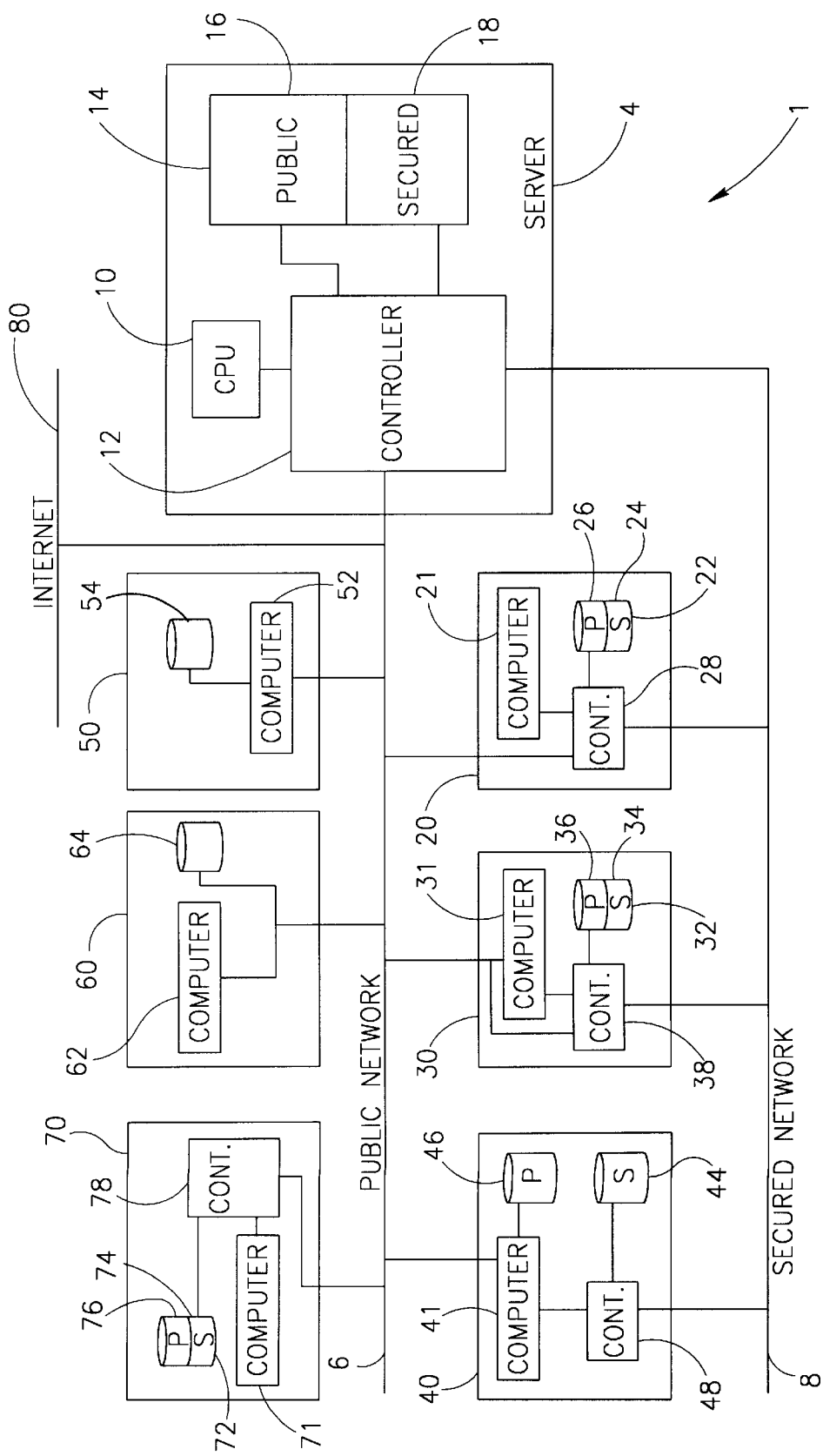
FIG. 1 is a schematic illustration of a network providing secured information communication, constructed and operative in accordance with a preferred embodiment of the invention.

Reference is now made to FIG. 1 which is a schematic illustration of a network providing secured information communication, generally referenced 1, constructed and operative in accordance with a preferred embodiment of the invention.

Network 1 includes a plurality of nodes, referenced 20, 30, 40, 50, 60 and 70, a server 4, a public network 6 and a secured network 8. All of the nodes 20, 30, 40, 50, 60 and 70 are interconnected via public network 6.

According to the present example, nodes 20, 30, and 40 are also interconnected via secured network 8. The public network 6 is also connected to an external network which in the present example is the Internet 80.

Server 4 includes a Central Processing Unit 10 (CPU), a storage unit 14 and a controller 12. The controller 12 is adapted to receive transmissions from networks 6 and 8 and write them in various locations in the storage unit 14. The storage unit is divided into at least two areas, a public area 16 and a secured area 18. The public area 16 contains non-confidential information whereas the secured area 18 contains classified information.

Node 20 is a secured node which is able to transmit and receive confidential information over the networks 6 and 8. The node 20 includes a computer station 21, a storage unit 22 and a communication controller 28. Communication controller 28 is connected to the computer station 21, the storage unit 22, the public network 6 and the secured network 8. The storage unit 22 is divided into two storage areas, a public storage area 26 and a secured storage area 24.

The communication controller 28 controls all communication to and from node 20. The communication controller 28 provides access to the public storage area 26 to both networks 6 and 8. The communication controller 28 provides, only the secured network 8 with access to the secures storage area 24.

At node 20, all of the communication with the public network 6 goes through the communication controller 28. Thus, the communication controller 28 monitors and controls all communications between the computer 21 and the public network 6.

Node 30 is a secured node which is able to transmit and receive confidential information over the networks. The node 30 includes a computer station 31, a storage unit 32 and a communication controller 38. Communication controller 38 is connected to the computer station 31, the storage unit 32, the public network 6 and the secured network 8. The computer 31 is also connected to the public network 6. The storage unit 32 is divided into two storage areas, a public storage area 36 and a secured storage area 34.

The communication controller 38 monitors all of the communication transmissions received from the public network so as to detect access attempts to the secured storage area 34. When such an attempt is detected, the communication controller denies access to the secured area 34 and executes an alert procedure to alert the user of the node 30.

Node 40 is a secured node which is able to transmit and receive confidential information over the networks 6 and 8. The node 40 includes a computer station 41, a public storage unit 46, a secured storage unit 44 and a communication controller 48. Communication controller 48 is connected to the computer station 41, the secured storage unit 44, and the secured network 8. The computer 41 is also connected to the public network 6 and to the public storage unit 46.

The communication controller 48 provides access to the secured storage unit 44. The public network 6 has access to the public storage area 46 via the computer 41.

Node 50 is a non-secured node having a storage unit 54 and a computer 52, connected thereto and to the public network 6. Node 60 is a non-secured node having a storage unit 64 and a computer 62. Both the storage unit 64 and a computer 62 are interconnected as well as connected to the pubic network 6.

It will be noted that nodes 50 and 60 are connected to the public network 6 only and thus are not authorized to access any confidential information which is stored on any of the secured storage areas 34, 44, 24 and 18.

Node 70 is a locally secured node having a computer 71, a storage unit 72 and communication controller 78. The storage unit 72 is divided into two storage areas, a public storage area 76 and a secured storage area 74.

The communication controller 78 is connected to the storage unit 72, the public network 6 and to the computer 71. The computer 71 is connected to the public network 6. When the communication controller 78 detects that the computer 71 is in communication with the network 6, it denies any access to the secured storage area 74.

According to the invention, each of the communication controllers 18, 28, 38, 48 and 78 monitors all of the communication transmissions received from the public network 6 so as to detect access attempts to a respective secured storage area connected thereto. When such an attempt is detected, the respective communication controller denies access to the relevant secured area and executes an alert procedure to alert any user using the node or server.

According to the present invention, all of the above three implementations for determining the first and second segments are available for the present example, wherein the first segment is stored in a public storage area of the receiving node and the second segment is stored in a secured storage area of the receiving node. It is noted that for such matters, a server can be considered a node.

According to the invention, non-confidential data from any node to any node can be transmitted over the public network 6 and stored in a public storage area of the receiving node. Confidential information can be transmitted over the public network 6, divided into a first and second segments and stored accordingly wherein the first segment is stored in the public storage area of the receiving node and the second segment is stored in the secured storage area of the receiving node.

For example, retrieving confidential information from the server 4 is performed by transmitting a retrieval request divided into two segments where the first segment is transmitted over the main network 6 and to the destination node and the second segment is transmitted to the destination node over the secured network 8. Hence, only nodes which are connected to the secured network 8 receive the two segments which are required to reconstruct the classified information.

Thus, a request for altering data stored in the secured area 18 will only be performed if received, at least partially, via the secured network 8.

Dividing a file into segments can be performed according to numerous ways such as generating the first segment from all of the odd bits in the original file and generating the second segment from all even bits in that original file, splitting the file in half, splitting the file into a predetermined large number of segments, and the like.

According to one aspect of the invention, the public network 6 and the secured network 8 are both implemented on the same communication medium, in different ways. For example, the public network 6 is represented by a modulated transmission in a first predetermined frequency and the secured network 8 is represented by a modulated transmission in a second predetermined frequency. Furthermore, any of communication networks 6 and 8 may consist of cable communication, wireless communication, optical communication and the like.

According to the present example, communication of confidential information between two nodes can be performed only between nodes which are connected via the secured network 8. For example, when node 40 needs to transfer confidential information to node 20, the confidential information is divided into two elements. The two elements are transmitted from node 40 to node 20 wherein the first element is transmitted over the public network 6 and the second element is transmitted over the secured network 8.

Figure 2:
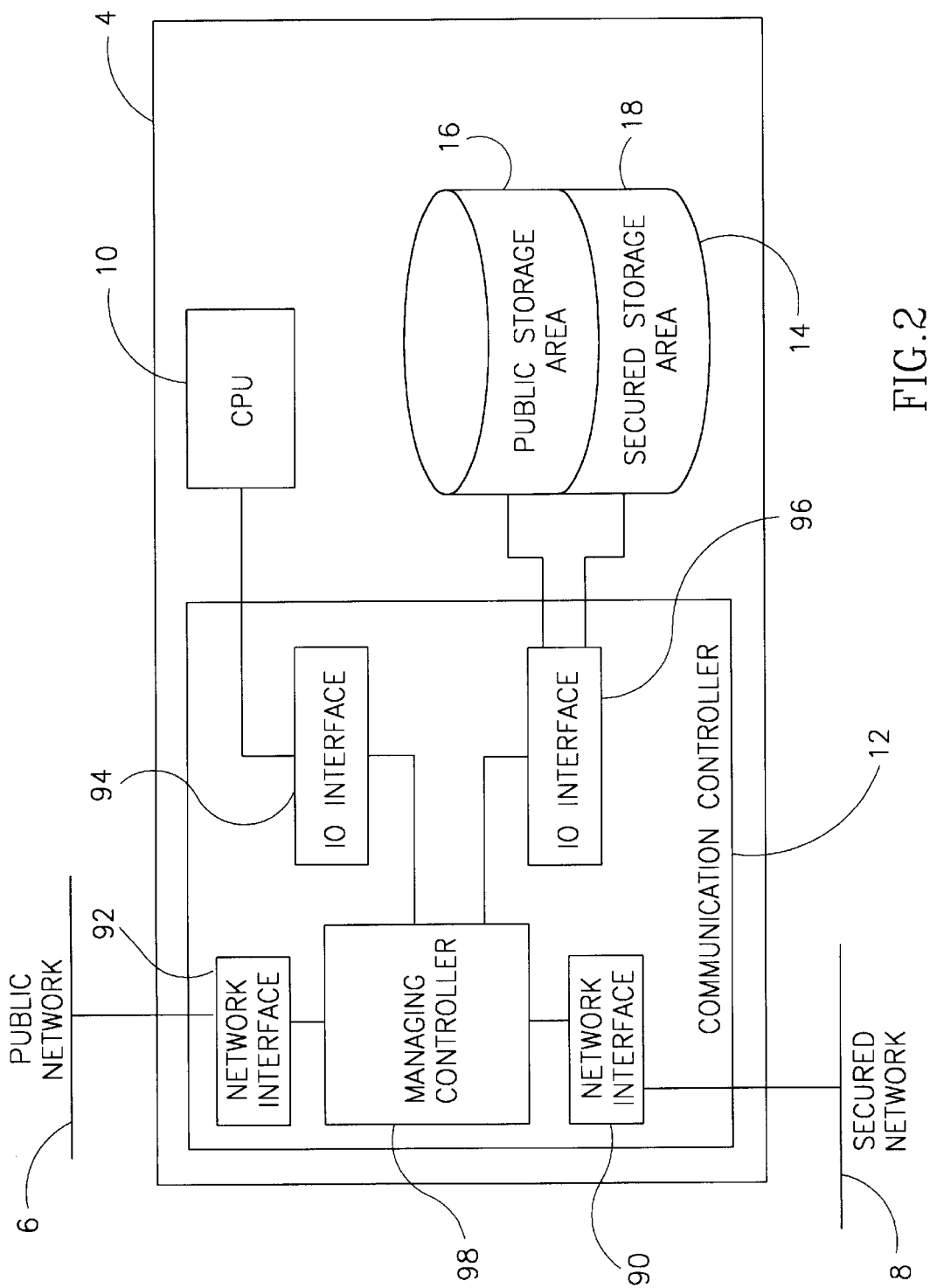
FIG. 2 is a schematic illustration in detail of the server of FIG. 1 and the communication controller, according to the invention.

Reference is now made to FIG. 2 which is a schematic illustration in detail of server 4 of FIG. 1 and the communication controller 12 according to the invention.

The communication controller 12 includes a network interface 92, connected to the public network 6, a network interface 90 connected to the secured network 8, an input/output (I/O) interface 96 connected to the storage unit 14, an I/O interface 94 connected to the CPU 10 and a managing controller 98. The managing controller 98 is also connected to the network interface 92, the network interface 90, the I/O interface 96 and the I/O interface 94.

The managing controller 98 provides access to the secured storage area 18 only to access requests which are provided via the secured network 8.

According to the invention, an access request may include several data segments wherein some of these segments are received from the public network 6 and the rest are received from the secured network 8.

The managing controller 98 combines these data segments back to form the original access request and executes it.

Thus, information can be stored in the secured storage area 18 in two cases, either if at least partially received from the secured network 8 or if originally determined as confidential information by one of the computers 20, 30 and 40, connected to the secured network 8. It will be appreciated that security is enhanced when all of the secured information is transmitted over the secured network 8.

According to the invention, a confidential information file arrives at the server 4 divided into at least two segments. This confidential information file can be stored either in the secured storage area 18 or both in the secured storage area 18 and the public information storage area 16, according to several storing and retrieving modes.

According to one storing mode, the managing controller 98 receives the confidential information file divided into several segments. The managing controller 98 then stores some of these segments in the secured storage area 18 and the rest of the segments in the public storage area 16.

According to another storing mode, the managing controller 98 combines all of the segments to form a single file and stores it in the secured information storage area 18.

According to a further storing mode, the managing controller 98 stores the confidential information file in the secured storage area in a segmented form. According to this mode, when requested to retrieve this information from the storage unit 14, the managing controller 98 accesses the segments which form the confidential information file and transmits them without any processing, reassembling and the like.

According to another aspect of the invention, the server 4 reassembles the original file of the confidential information from segments of the classified information and stores it as one file in the secured information storage area 18.

Figure 3:
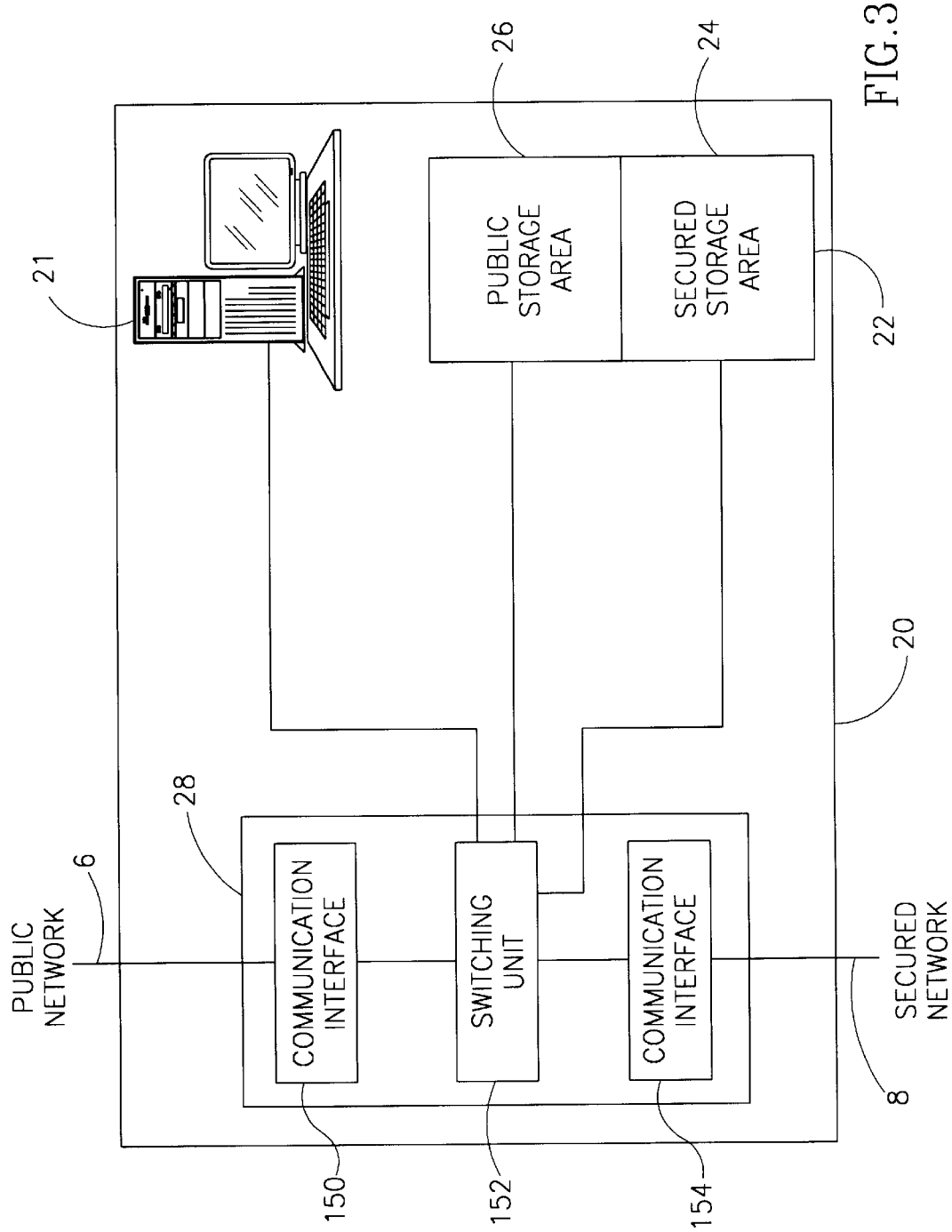
FIG. 3 is a schematic illustration in detail of a node, shown in FIG. 1 and a communication controller therefor, according to the invention.

Reference is now made to FIG. 3 which is a schematic illustration in detail of node 20 of FIG. 1 and the communication controller 28 according to the invention.

The communication controller includes a communication interface 150 for connecting to the public network 6, a communication interface 154 for connecting to the secured network 8 and a switching unit 152 for directing data inside the node 20. Communication of node 20 to any of the two networks 6 and 8 must be performed via the communication controller 28.

Figure 4:
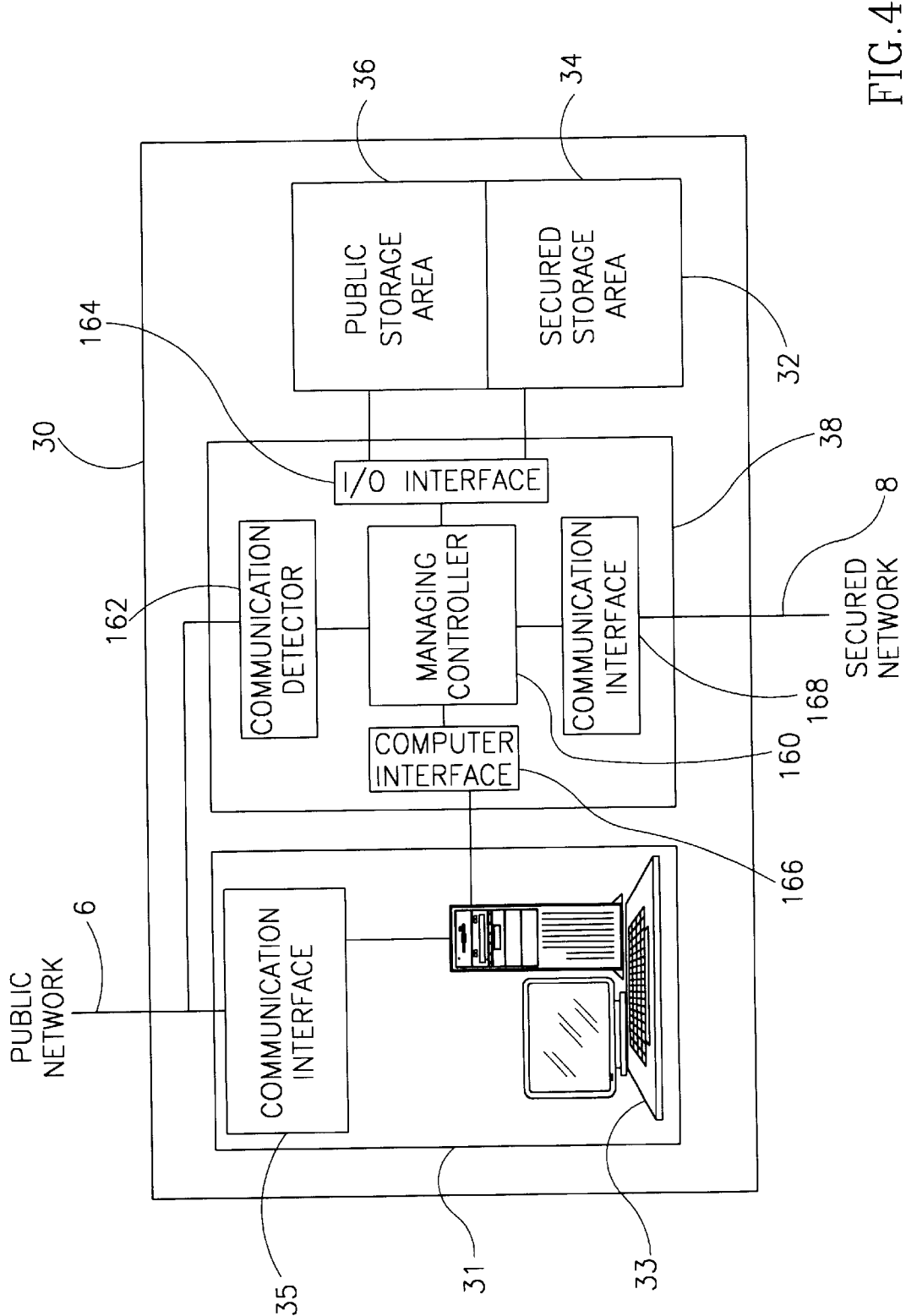
FIG. 4 is a schematic illustration in detail of another node shown in FIG. 1.

Reference is now made to FIG. 4 which is a schematic illustration in detail of node 30 of FIG. 1.

The computer 31 includes a working station 33 and a communication interface 35, connected thereto. The communication controller 38 includes a communication detector 162, a managing controller 160, a computer interface 166, an I/O interface 164 and a communication interface 168.

The communication detector 162 is connected to the managing controller 160 and to the public network 6 for detecting communications received by computer 31. The computer interface 166 is connected to the managing controller 160 and to the computer 31. The I/O interface is connected to the managing controller 160 and to the storage unit 32.

The communication interface 168 is connected to the managing controller 160 and to the secured network 6.

Communication interface 168 is a conventional WAN or LAN interface, such as a modem or an Ethernet interface. According to the present example, the computer 31 can communicate over the public network 6 directly via the communication interface 35.

The computer 31 receives access requests from public network 6 via the communication interface 35. The computer 35 provides these requests to the managing controller 160 via the computer interface 166. The managing controller 160 retrieves the information from the public storage unit 36 and provides it to the computer 31 which, in turn, transmits it to the public network 6 via the communication interface 35.

The managing controller 160 also detects access requests directly from the public network 6 and processes them. If the managing controller 160 detects an information request which relates to information stored in the secured storage area 34, a corresponding request for this information provided by the computer 31 will be denied.

It is noted that non-restricted communication between the public network 6 and the non-secured areas of node 30, such as the computer 31 and the public storage area 36, is provided directly via the communication interface 35 and as such is not interrupted by the communication controller 38.

The communication controller 38 also provides a full separation security mode. According to this mode, when the communication detector 162 detects that the computer 31 is communicating with the public network 6, it physically disables the I/O interface 164 and the communication interface 168, thus eliminating any access to the secured storage area 34 and to the secured network 8.

Referring back to FIG. 1, there is provided a further aspect of the present invention, in which node 40 is defined as a security supervising station. Thus, when a secured node such as node 20 wants to transmit data from the secured storage area 24 to a non-secured node, for example to node 50, node 20 transmits this data to node 40. Node 40, receiving this data, stores it in the secured storage unit 44 and also provides it to the supervisor. When the supervisor provides his authorization, the node 40 transferes the data to public storage unit 46 and further transmits it to node 50. According to an additional aspect of the invention, node 40 operates as a "Store-and-Forward" buffer whereby at any point in time, it is either in communication with the public network 6 or with the secured network 8, but not to both networks. This means that the communication controller 48 provides communication with the secured network 8 only when the computer 41, disconnects from the public network 6. According to this aspect of the invention, there can be no on-line communication between the public network 6 and secured network 8, via node 40.

Figure 5:
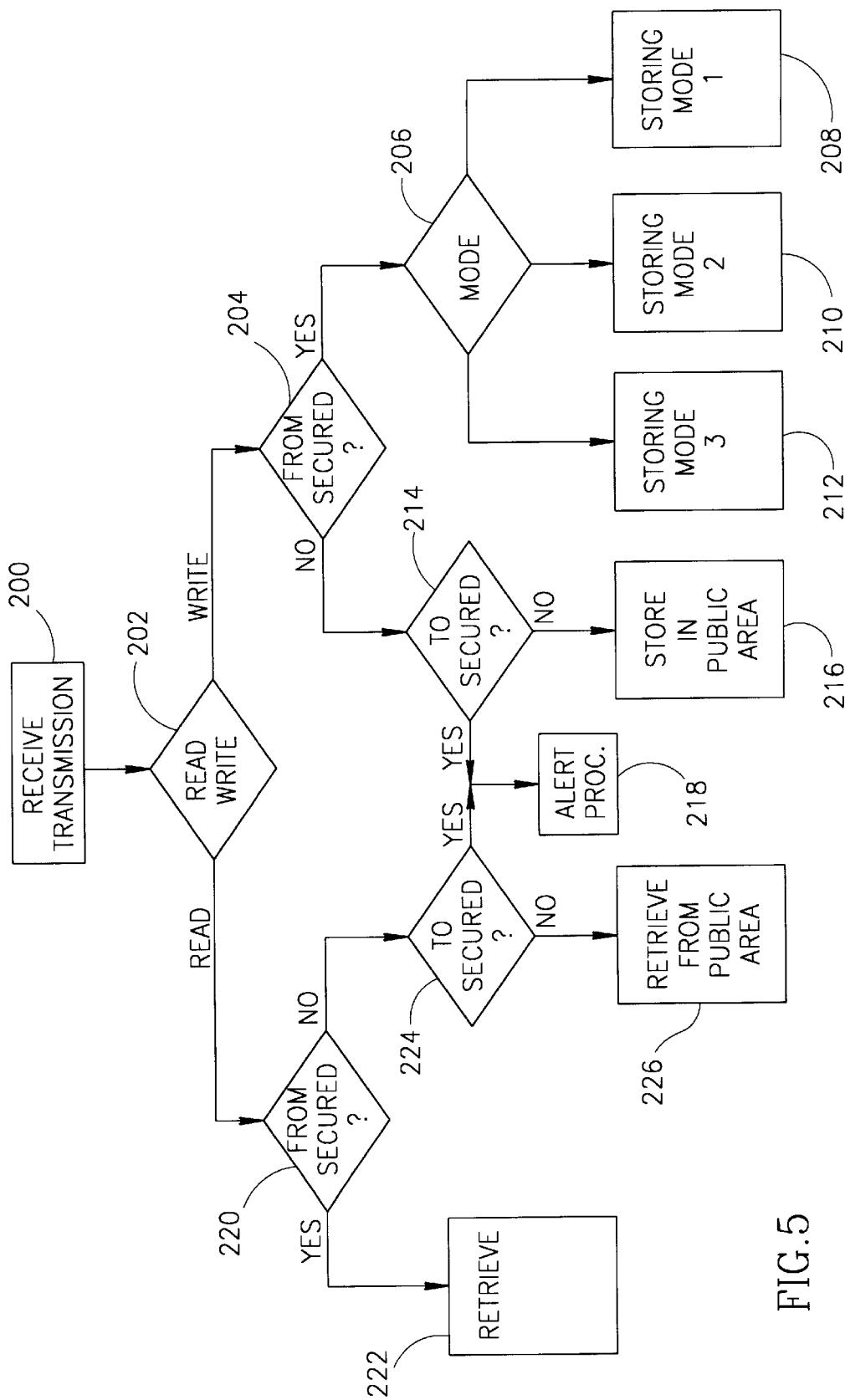
FIG. 5 is a schematic diagram of a method for operating a communication controller so as to provide limited communication access to a computer, operative in accordance with another preferred embodiment of the invention.

Reference in now made to FIG. 5 which is a schematic diagram of a method for operating a communication controller so as to provide limited communication access to a computer, operative in accordance with another preferred embodiment of the invention.

In step 200, the communication controller receives a transmission.

In step 202, the communication controller determines the type of request contained in the received transmission. If the received transmission contains a write access request, such as alter data, format, delete, move, copy and the like, then the controller proceeds to step 204. If the received transmission contains a read access request, then the controller proceeds to step 220.

In step 204, the communication controller determines if at least a portion of the transmission was received via the secured network. If so, then the communication controller proceeds to step 206. Otherwise, the communication controller proceeds to step 214.

In step 206, the communication controller determines a storing mode, as described hereinabove, according to which the transmission will be stored and proceeds to a respective step 208, 210 and 212.

In step 214, the communication controller determines if the requested destination of the transmission is the secured area. If so, then the communication controller proceeds to step 218. Otherwise, the communication controller proceeds to step 216.

In step 216, the communication controller stores the transmission in the public storage area.

In step 218, the communication controller executes an alert procedure. Such an alert procedure can be denying access to the secured area, producing an alert message or signal to the user operating the computer connected to the communication controller, halting selected activities in the node including the communication controller, and the like.

For reading , the communication controller determines (in step 220) if at least a portion of the transmission was received via the secured network. If so, then the communication controller proceeds to step 222. Otherwise, the communication controller proceeds to step 224.

In step 222, the communication controller retrieves data, according to the access request contained in the transmission.

In step 224, the communication controller determines if the requested destination of the transmission is the secured area. If so, then the communication controller proceeds to step 218. Otherwise, the communication controller proceeds to step 226.

In step 226, the communication controller retrieves data, from the public storage area, according to the access request contained in the transmission.

Figure 6:
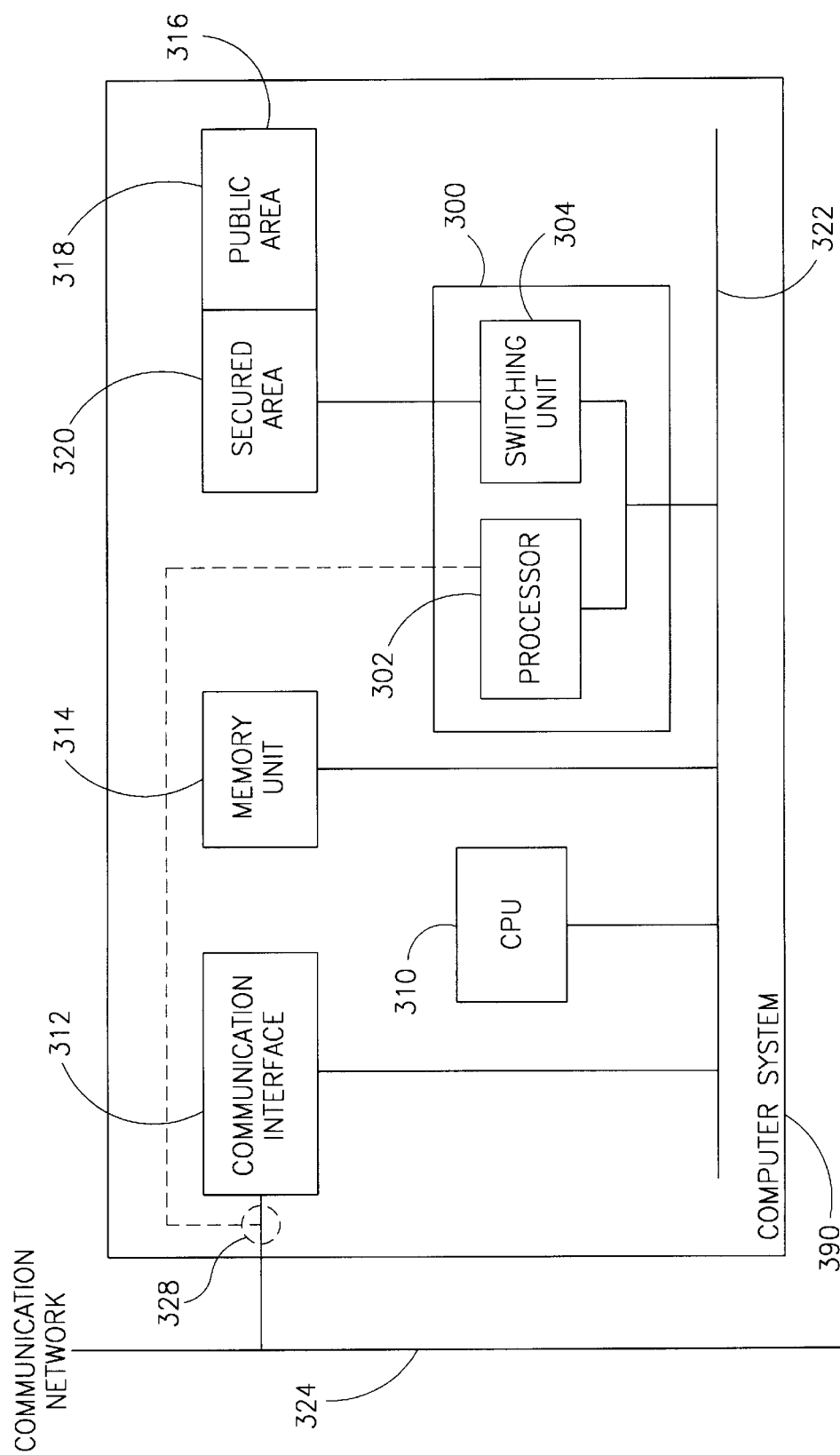
FIG. 6 which is a schematic illustration of a computer system and a device for securing the computer system during communication, constructed and operative in accordance with a further preferred embodiment of the invention.

Reference is now made to FIG. 6 which is a schematic illustration of a computer system, referenced 390, and a device, referenced 300, for securing the computer system during communication, constructed and operative in accordance with a further preferred embodiment of the invention.

Computer system 390 includes a Central Processing Unit (CPU) 310, a memory unit 314, a storage unit 316, a communication interface 312 for connecting to a communication network 324 and a communication bus 322. The device 300 according to the invention includes a processor 302 and a switching unit 304 connected thereto.

The storage unit 316 is divided into two areas, a public area 318 and a secured area 320. The device 300 controls the storage unit 316 so as to provide full access to the public area 318 via communication bus 322, to all of the components of the computer system 390 such as the CPU 310 and the communication interface 312.

The processor 302 controls the switch 304 so as to allow or deny access to the secured area 320. According to one aspect of the invention, the device 300 provides analysis management during and right after communication. Denying access to the secured area 320 can be implemented in several manners which include denying full access, providing read only access and the like.

According to the invention, during on-line communication with the network 324, the device 300 disconnects the secured area 320 from the computer system and denies all access to it. In addition, the processor 302 monitors all data transfer on communication bus 322, detects data changes in the public area 318 of storage unit 316 and generates a log file therefrom.

When the computer system 390 is disconnected from the network 324, the processor 302 retrieves an analysis software application from the secured area, generates a security key and provides the security key to the analysis software. In the present example, the analysis software application is an anti-virus scanning software. Then, the processor 302 provides the analysis software application to the CPU 310. The CPU 310 executes the analysis software application according to the log file on all of the data changes in the public area 318.

If the analysis software application does not detect any hostile software or in that matter, any suspicious data change, it returns the security key to the processor 302. Then, the processor 302 operates switching unit 304 so as to enable access to the secured area 320.

The device 300 is operative to deny access to the secured area 320 according to several method and parameters. According to one aspect of the invention, the secured area 320 is defined physically according to address. Thus, access is denied to selected addresses and provided to all the rest. A processor for this implementation may consist of a few logical NAND gates which automatically deny access to the secured area addresses.

According to another aspect of the invention, the secured area 320 is defined according to logical address, such as file name, directory name, logical attributes, and the like, to which access is denied.

Detection of an on-line communication situation is possible in several methods. According to one method, detection is provided via a direct connection to the communication line via a dedicated communication interface, as described in conjunction with communication controller 28 of FIG. 3, thus monitoring all activity therein. Alternatively, the device 300 is indirectly connected to the communication line, for example, by sensing the electromagnetic field produced in the vicinity of the communication cable, as indicated by reference 328, thus monitoring all activity therein. Further, either the computer system 390 or the communication interface provide information relating to the communication status to the device 300. Still further, a designated software application, such as a communication software provides information relating to the communication status to the device 300.

Figure 7:
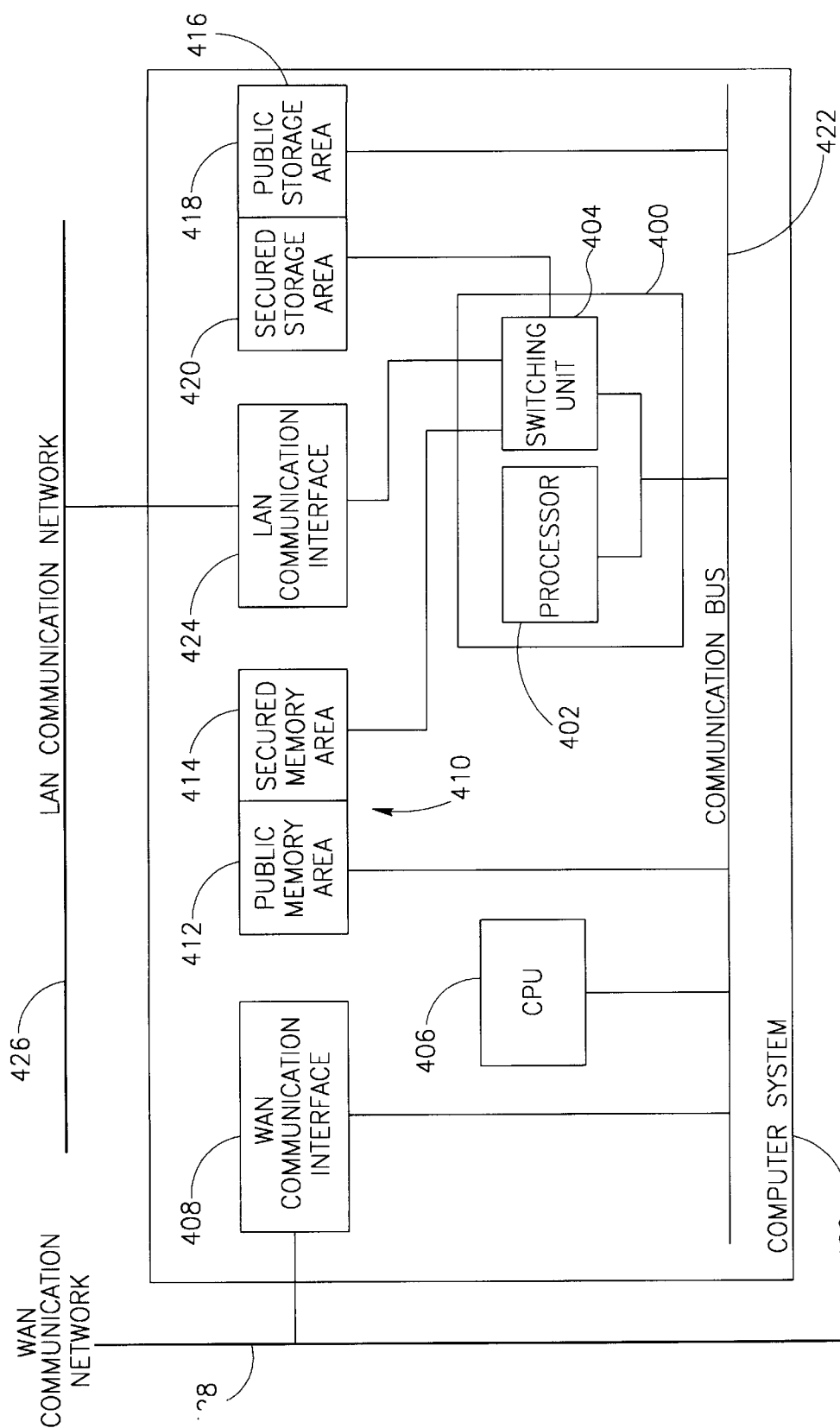
FIG. 7 is a schematic illustration of a computer system and a device for securing the computer system and its environment during communication, constructed and operative in accordance with yet a further preferred embodiment of the invention.

Reference is now made to FIG. 7 which is a schematic illustration of a computer system, referenced 490 and a device, referenced 400, for securing the computer system and its environment during communication, constructed and operative in accordance with yet a further preferred embodiment of the invention.

Computer system 490 includes a Central processing unit (CPU) 406, a memory unit 410, a storage unit 416, a WAN communication interface 408 for connecting to a WAN communication network 428, a LAN communication interface 424 for connecting to a LAN communication network 426 and a communication bus 422. The device 400 includes a processor 402 and a switching unit 404 connected thereto. It will be appreciated that this is a non-limiting example and that each of communication networks 428 and 424 can be any type of network such as a WAN, a LAN, a wireless communication network, an optical based network and the like.

The storage unit 416 is divided into two areas, a public storage area 418 and a secured storage area 420. The memory unit 410 is divided into two areas, a public memory area 412 and a secured memory area 414. According to one aspect of the invention, the two storage areas 418 and 420 can be a single storage unit which is divided into two parts, which is fully controlled by the device 400.

According to another aspect of the invention, the two storage areas 418 and 420 are two separate storage units which are not interconnected, whereas the device 400 fully controls the access to the secured storage area 418 and is adapted to perform an analysis procedure on the public storage area 420.

According to a further aspect of the invention, each of the storage areas 418 and 420 includes several storage units.

The public storage area 418, the public memory area 412, the CPU 406, the WAN communication interface 408 and the device 400 are interconnected via the communication bus 422.

The secured storage area 420, the secured memory area 414 and the LAN communication interface 424 are connected to the switching unit 404.

The processor 402 controls the switching unit 404 so as to allow or deny access to the secured storage area 420, the secured memory area 414 and the LAN communication interface 424. Access is denied when the computer system 490 is in communication with the WAN network via the WAN communication interface 408.

The device 400 operates generally similar to device 300. The device 400 is thus operative according to the method described hereinbelow with respect to FIG. 9 whereas, as long as a security flag, determined in this method, is on, access is denied to the secured storage area 420, the secured memory area 414 and the LAN communication interface 424.

According to a further aspect of the invention, the processor 402 is operative to execute an analysis software application in the secured memory area 414, which scans the public memory area 412 and the public storage area 418 after WAN communication is disconnected. Thus, the analysis software application is never accessible to unauthorized elements such as hostile programs or outside users.

According to the present invention, the device 400 can deny access to any device connected thereto, during communication, so as to prevent unauthorized access.

Figure 8:
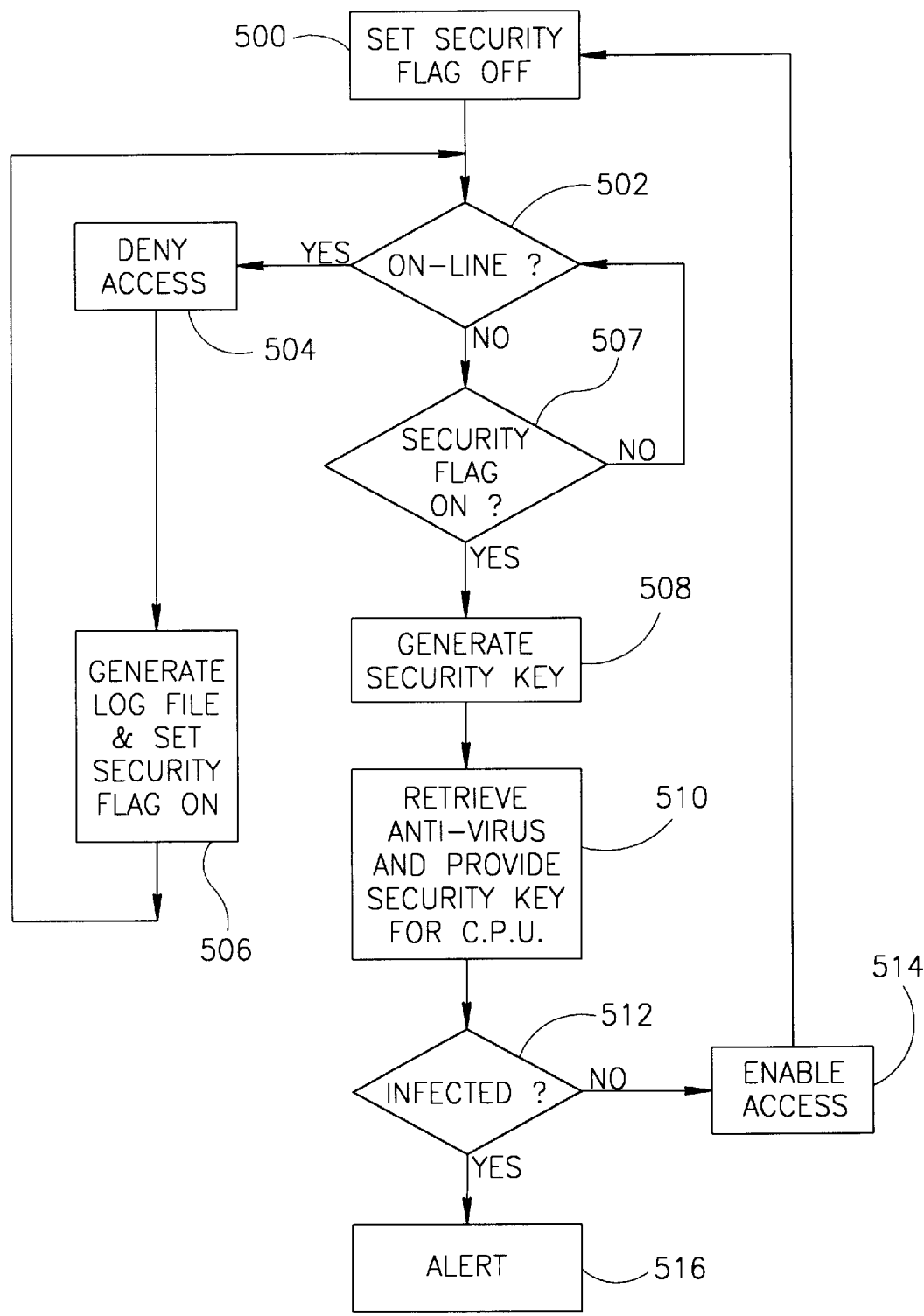
FIG. 8 is a schematic illustration of a method for operating communication controllers shown in FIGS. 1, 6 and 7, operative in accordance with a further preferred embodiment of the invention.

Reference is now made to FIG. 8 which is a schematic illustration of a method for operating devices 28, 38, 48

(FIG. 1), 300 (FIG. 6) and 400 (FIG. 7), operative in accordance with a further preferred embodiment of the invention. In the present example, the description refers to device 300 and computer system 390 of FIG. 6. The method includes the following steps:

In step 500, the device sets a security flag to off.

In step 502, the device 300 detects if the computer 390 performs on-line communication. If so, the device proceeds to step 504. Otherwise, the device proceeds to step 507. Off-line communication is defined either when the communication interface (for example, the modem) is disconnected from the network, or when the computer is disconnected from the communication interface, either temporarily, or permanently, while communication interface stays connected and communicating with the network.

In step 504, the device 300 disconnects the secured area 318 from the rest of the computer system 390.

In step 506, the device 300 turns the security flag on and generates a log file of the data changes which occur in the computer system 390 and its public storage area, during communication, due to incoming data and the like. At the same time, the device proceeds back to step 502 for confirming that communication is on-line.

In step 507, if the security flag is on, then the device proceeds to step 508. Otherwise the device proceeds back to step 502.

In step 508, the device 300 generates a security key and proceeds to step 510.

In step 510, the device 300 retrieves an analysis software application from the secured area, provides the security key to the analysis software application and provides them both to the CPU 310.

In step 512, the CPU executes the analysis software application, on all data changes which, according to the log file, occurred during on-line communication. The analysis software application detects if any hostile attempt was made to damage the information contained therein. If so, the computer system 390 proceeds to step 516. Otherwise, the system 390 proceeds to step 514.

In step 514, the analysis software application returns the security key to the processor 302, which in turn enables access to the secured area 320 and proceeds back to step 500.

In step 516, the computer system 390 provides the user with a warning and halts.

The security key is preferably generated according to a momentary data situation in the secured area 320. The security key can also be generated as a one time key which is independent of the secured area 320, such as according to an internal random generator and the like. The main reason for this it to minimize and preferably eliminate all possible access to this security key from elements which are not authorized and which may attempt to try to provide this key to the processor 302.

Figure 9:
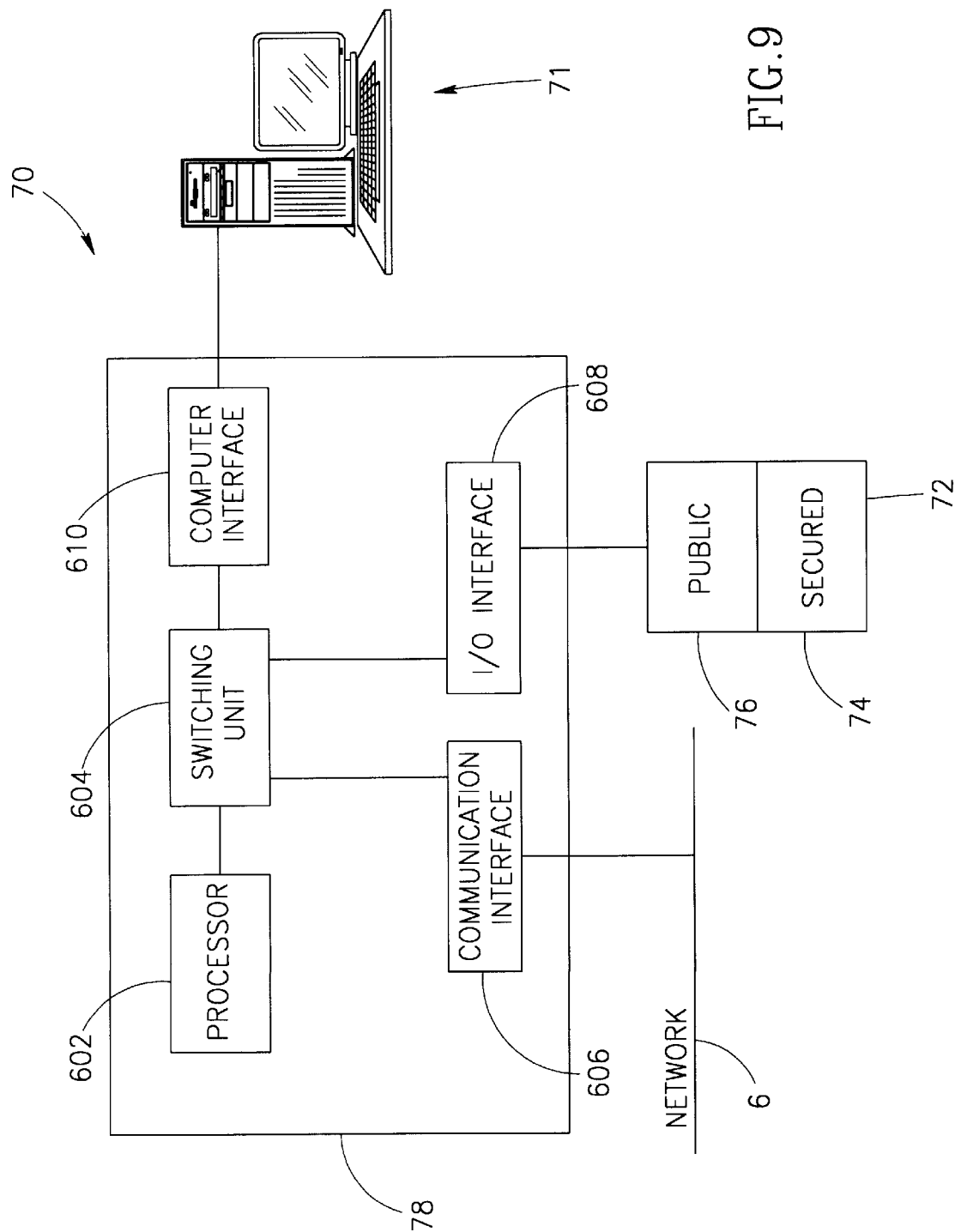
FIG. 9 is a schematic illustration in detail of a further node, shown in FIG. 1.

Reference is now made to FIG. 9 which is a schematic illustration in detail of node 70 of FIG. 1.

The communication controller 78 according to the invention includes a processor 602, a switching unit 604, a communication interface 606, an input-output (I/O) interface 608, a computer interface 610. Communication controller 78 is connected to a network 6 via the communication interface 606, to storage unit 72 via I/O interface 608 and to the computer system 71 via computer interface 610. The storage unit 72 is divided into two major sections, a public section 76 and a secured section 74. According to the present example, I/O interface is either an IDE-ATA or SCSI disk controller.

The communication interface 606 is selected according to the type of network 6 and is selected from the group consisting of a dial-up modem, a WAN modem, a LAN modem, an optical modem, an ISDN modem, a cable television modem, and the like. The communication interface 606 may also be an I/O interface for connecting to a modem of any kind. The processor 602 controls the on-line physical connection of the computer station, the storage unit 72 and the network 6, therebetween.

The communication controller 78 is operative according to several modes of operation. According to one mode of operation, the communication controller 78, when receiving a communication request command from the computer system 71, operates the communication interface 606, so as to provide communication with network 6. At the same time, the communication controller 78 monitors all access requests to the storage unit 72, allows access to the public area 76 and denies access to the secured area.

According to a second mode of operation, when the computer system 71 provides the communication controller with a request to access the secured area 74, the communication controller 78 operates the switching unit 604 so as to disconnect the computer from the communication interface 606, while maintaining communication between the communication interface 606 and the network 6.

At that point, the processor 602 scans the public area 76 as well as any other storage unit in computer system 71 so as to detect harmful programs which may cause damage to the secured area. If such programs are not detected, the communication controller provides the computer system 71 with access to the secured area 74. When the computer system provides the communication controller 78 with a command to reconnect to the network, the communication controller 78 reconnects the computer system 71 with the communication interface 606 and simultaneously denies all access to the secured area 74.

According to a third mode of operation, the communication controller 78 terminates the communication with network 6 and the processor 602 scans the public area 76 as well as any other storage unit in computer system 71 so as to detect harmful programs which may cause damage to the secured area. If such programs are not detected, the communication controller provides the computer system 71 with access to the secured area 74.

It will be appreciated that the processor 602 can either scan or execute a scanning and analyzing software which is designed for this purpose. According to the present invention, the method described in FIG. 8, can be implemented in communication device 78.

It is noted that the processor 602, by controlling switching element 604 and communication interface 606, can disconnect the computer 71 from the network either by providing communication interface 606 with a command to terminate communication with network 6 or by operating switching element 604 so as to disconnect communication interface 606 from the computer 71 while maintaining the connection between the communication interface 606 and the network 6.

According to the invention, the processor 602 is also operative to receive, from the computer 71, commands to disconnect communication between the communication interface 606 and the network 6 or between the communication interface 606 and the switching element 604.

Figure 10:
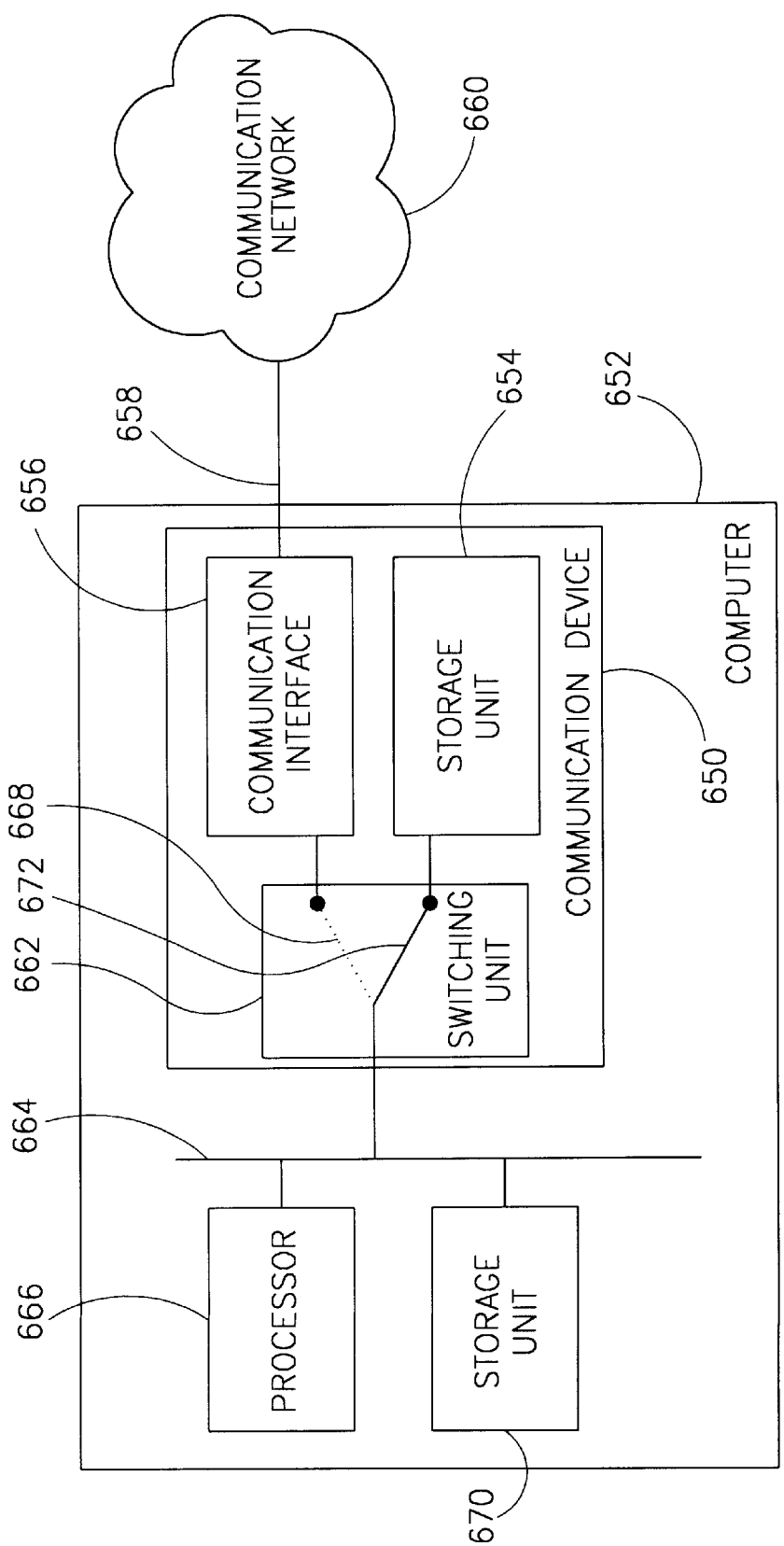
FIG. 10 is a schematic illustration of a computer station and a communication device, constructed and operative in accordance with a preferred embodiment of the invention.

Reference is now made to FIG. 10 which is a schematic illustration of a computer station and a communication device, generally references 650, constructed and operative in accordance with a preferred embodiment of the invention.

Device 650 includes a communication interface 656, a storage unit 654 and a switching unit 662. Communication interface 656 is connected to switching unit 662 and to a communication line 658, which is further connected to a communication network 660. Device 650 is connected to a data bus 664 of a computer 652 which further includes a processor 666 and a storage unit 670.

Communication interface 656 can be a conventional modem, a modem emulator, a network communication card, and the like. Storage unit 654 can be any type of data storage device such as ROM, RAM, flash memory, a disk, tape and the like. Some implementations of the invention such as the first one, require dynamic read\write storage units such as RAM, flash memory, a disk and the like, since the data stored in the secured storage unit is dynamic. Other implementations such as the second and third ones can use less dynamic storage units such as ROM, EPROM, EEPROM and the like, which are likely to simplify the overall structure and reduce the cost of manufacturing the device 650.

The device 650 is operative according to several modes, which enhance the security of confidential information against unauthorized access attempts from the network 660. Disclosed hereinafter are a number of non-restricting, exemplary modes.

According to a first mode, any confidential data file which needs to be secured is divided into two segments. The first segment is stored in the storage unit 670 of computer 652 and the second segment is stored in storage unit 654 of device 650. The division is performed so that reconstructing the original file using the first segment alone is likely to be extremely difficult which, in practice, may be considered impossible.

According to another mode, confidential data contained in storage unit 670 is encrypted using an exclusive encryption key, wherein when the encryption is complete, the key is stored in storage unit 654.

According to a further mode, all of the confidential data is stored in storage unit 654.

The computer 652 is able to communicate with the network via the communication interface 656, as indicated by the dotted line 668. When the computer 652 does not communicate with the network 660, the switching unit 662 disconnects the bus 664 from the communication interface 656 and connects the storage unit 654 to the bus 664, as indicated by line 672.

When the computer establishes a communication connection via communication interface 656, switching unit 662 disconnects storage unit 654 from the bus 664 and connects the communication interface 656 to the bus 664. Thus, any party communicating with the computer 652 has limited data access which is confined to the data stored in the computer storage unit 670 and not to the data contained in storage unit 654.

It will be appreciated that when the switching unit 662 disconnects the storage unit 654 from the bus 664 it makes the storage unit and all of the data contained therein unavailable.

The communication device 650 can be implemented as an add-on internal card according to conventional standards such as an AISA, VLB, PCI, PCMCIA and the like. The device can also be implemented as an external device for connecting via a serial port, a parallel port and the like. Thus, for example, the device 650 can be implemented as PCM-CIA modem card for a portable computer. The user can remove the communication device from the computer 652 and use it as a key. It will be appreciated that as long as the communication device 650 is not connected to the computer 652, there is no access to any data contained inside storage unit 654.

According to the present invention, the method described in FIG. 8 can be implemented in communication device 650.

Figure 11:
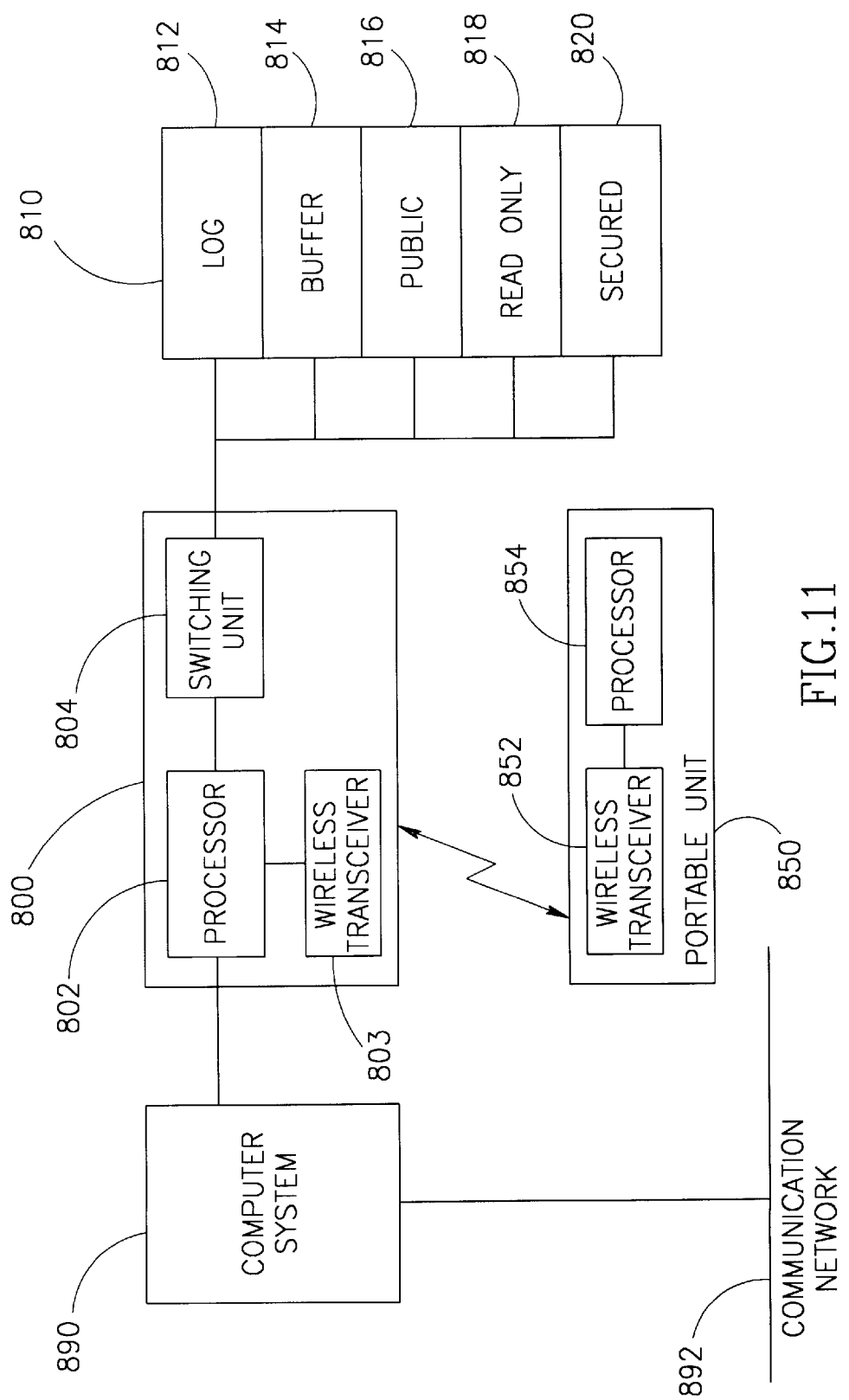
FIG. 11 is a schematic illustration of a computer system, a storage unit, a communication device and a portable unit, for securing the computer system during communication, constructed and operative in accordance with yet another preferred embodiment of the invention.

Reference is now made to FIG. 11 which is a schematic illustration of a computer system, referenced 890, a storage unit, referenced 810 a device, referenced 800 and a portable unit 850, for securing the computer system during communication, constructed and operative in accordance with yet another preferred embodiment of the invention.

The computer system 890 is connected to a communication network 892 and to the device of the invention 800. The device 800 is also connected to storage unit 810. The device 800 includes a processor 802, a switching unit 804 and a wireless transceiver 803.

The portable unit 850 includes a wireless transceiver 852 and a processor 854, connected thereto.

The storage unit 810 is divided into five areas:
 a log area 812, for managing a log file;
 a buffer area 814, for intermediately storing data upon receipt but before it is transferred into a secured area 820;
 a public area 816, which is accessible at all times;
 a read only area 818, for storing operating unit files, analysis software application and the like; and
 a secured area 820 for storing confidential information.

The device 800 manages the storage unit 810 as follows. When the computer system 890 is in an on-line communication with the communication network 892, the device 800 enables full access to the public area 816 and to the buffer area 814, for reading and writing. The device 800 also enables limited read-only access to the read only area 818. Simultaneously, the device 800 updates the log area with information relating to data changes in the storage unit 810 and data requests received from the computer system 890. The device 800 denies access to the secured area 820. After the computer system 890 is disconnected from the communication network 892, the device 800 retrieves an analysis software application from the read only unit and executes it, according to the information contained in the log area 812, on the data contained in the public area 816 and the buffer area 814. Any data which is destined for the secured area 820 is transferred from the public area 816 to the buffering area 814, scanned and, if classified as harmless, transferred to the secured area 820.

According to the present embodiment, the device 800 is operable to provide access secured areas in the storage unit 810 only when an authorized user, wearing the portable unit 850, is in the vicinity of the device 800.

According to a wireless mode of the invention, the wireless transceiver 852 transmits a signal to the wireless transceiver 803. The wireless transceiver 803 detects this signal and provides it to the processor 802 which regard it as an enable signal to provide access to the secured areas in storage unit 810. According to this mode, if the user has left the premises and wireless transceiver 803 does not detect the signal transmitted by the wireless transceiver 852, the device 800 denies access to the secured areas of the storage unit 810.

According to another wireless mode, the processor 854 provides the wireless transceiver 852 commands to transmit a different signal from time to time. The processor 802 is then adapted to recognize the various signals or the change between them.

According to a further wireless mode, wireless transceiver 803 and wireless transceiver 852 communicate using bi-directional communication. Thus, the processors 802 and 854 are operative to exchange decoded signals, so as to enhance even more the level of security.

Figure 12:
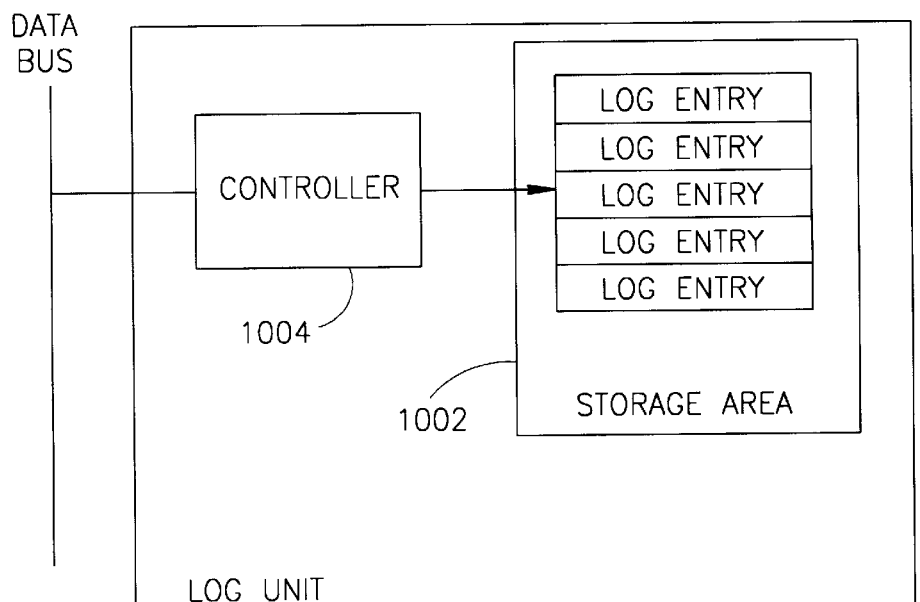
FIG. 12 is a schematic illustration of a log unit, constructed and operative in accordance with yet another preferred embodiment of the invention.

Reference is now made to FIG. 12 which is a schematic illustration of a log unit, referenced 1000, constructed and operative in accordance with yet another preferred embodiment of the invention.

The log unit 1000 includes a storage area 1002 and a controller 1004 connected thereto. The controller 1004 is operative to provide sequential writing of log entries in the storage unit as well as random-access reading of log entries contained therein.

According to the invention, when the controller 1004 receives a write-command to register a new log entry, it ignores the address which may be incorporated in the write-command and assign an address which is in sequence with the address of the previous write-command. Thus, an attempt to change a preselected log entry with a write-command which includes a specific address will not be executed. According to one aspect of the invention, when such an attempt occurs, the controller 1004 produces an alert command to a computer (not shown) connected thereto.

One of the main advantages of this log unit is that it does not permit free writing access to the log area, thus preventing any deliberate change of a preselected log entry.

When a log file is located in a finite size storage area, sometimes it exceeds the limit of storage space. The common solution in this situation is to define the log file as a cyclic file, i.e. after writing the last possible entry, at the end of the log file, then start writing at the beginning of the log file. Thus, if one wishes to change the log file, he may write as many log entries needed to fill and rewrite the entire log file.

The method according to the invention, overcomes this problem by providing a minimum time period between two sequential log entry write commands. Thus, writing over an entire log file is limited so that one cannot be performed it in a short period of time.

Figure 13:
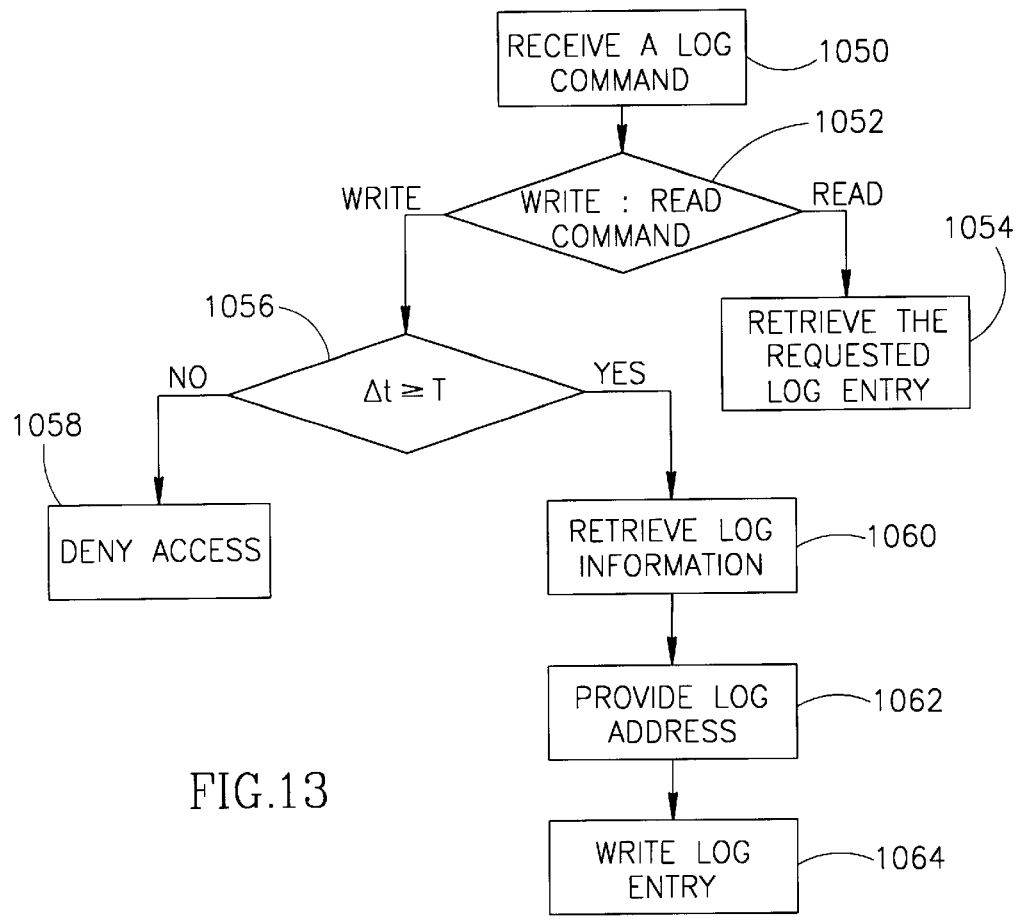
FIG. 13 is a schematic illustration of a method for operating the log unit of FIG. 12, operative in accordance with yet a further preferred embodiment of the invention.

Reference is now made to FIG. 13 which is a schematic illustration of a method for operating the log unit 1000 of FIG. 12, operative in accordance with yet a further preferred embodiment of the invention.

In step 1050, the log unit 1000 receives a log command.

In step 1052, if the received log command is a write command, then the log unit 1000 proceeds to step 1056. Otherwise, if the received log command is a read command the log unit 1000 proceed to step 1054.

In step 1054, the log unit 1000 retrieves a requested log entry.

In step 1056, if the time period Δ is greater than or equal to a predetermined period of time T, then the controller 1004 proceed to step 1060. Otherwise, the controller 1004 proceeds to step 1058.

In step 1058, the controller 1004 denies access to the to the storage area 1002.

In step 1060, the controller 1004, retrieves the log information from the log command and proceeds to step 1062.

In step 1062, the controller 1004 provides a log address which is in sequence with the address of the previous write-command.

In step 1064, the controller 1004 writes a log entry containing the log information at the log address.

According to a further aspect of the invention, step 1058 may also include producing an alarm signal to alert a supervisor, and the like.

Figure 14:
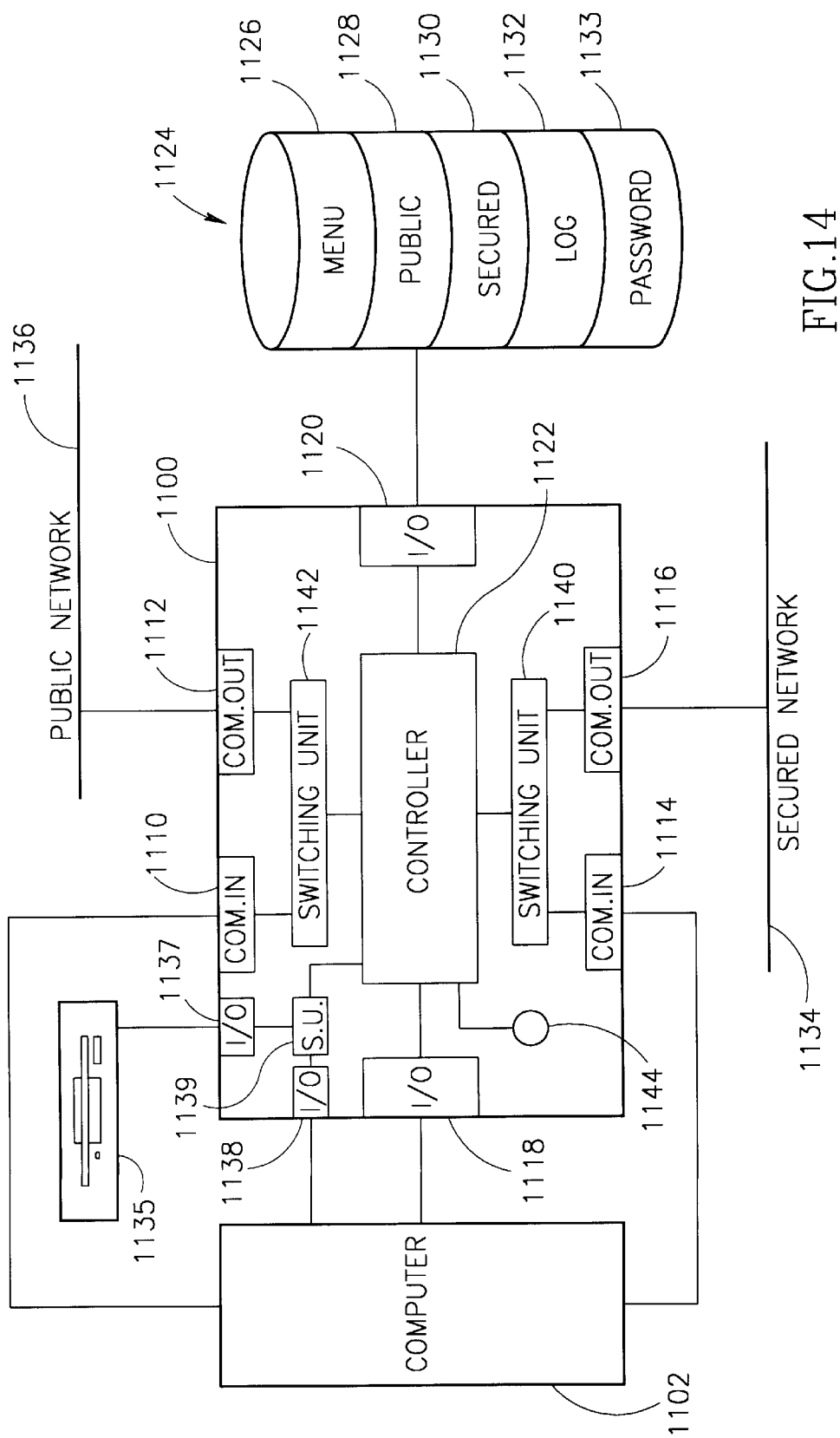
FIG. 14 is a schematic illustration of a computer and a device, constructed and operative in accordance with a further preferred embodiment of the invention.

Reference is now made to FIG. 14 which is a schematic illustration of a computer 1102 and a device, generally referenced 1100, constructed and operative in accordance with a preferred embodiment of the invention.

The device 1100 includes a managing controller 1122, two disk drive input-output (I/O) interfaces 1118 and 1120, an I/O switching unit 1139, two diskette drive input-output (I/O) interfaces 1137 and 1138, a first pair of communication interfaces 1110 and 1112 for connecting the computer 1102 to a public network 1136 and a pair of communication interfaces 1114 and 1116 for connecting the computer 1102 to a secured network 1134, two communication switches 1140 and 1142 and a display 1144, connected to managing controller 1122.

Disk drive input-output (I/O) interfaces 1118 and 1120 are connected to managing controller 1122. I/O switching unit 1139 is connected to the two diskette drive input-output (I/O) interfaces 1137 and 1138 and to managing controller 1122.

Communication interface 1110 is connected to communication switch 1142 and to the computer 1102. Communication interface 1112 is connected to communication switch 1142 and to the public network 1136. Communication switch 1142 is connected to managing controller 1122.

Communication interface 1114 is connected to the communication switch 1140 and to the computer 1102. Communication interface 1116 is connected to the communication switch 1140 and to the secured network 1134.

The device 1100 is connected to a storage unit 1124 via I/O interface 1120. The storage unit 1124 is divided into a plurality of areas: a menu area 1126, a secured area 1130, a public area 1128, a log area 1132 and a password area 1133.

The public area 1128 contains data and software which are not confidential. The secured area 1130 contains data and software which are confidential. The log area 1132 contains a log file architecture according to conventional methods or according to the invention, as described hereinabove. The password area 1133 contains passwords which may be utilized during various procedures by the managing controller 1122, such as switching between modes and the like.

The menu area 1126 includes a pre-operation system menu, which manages the computer 1102 as the computer 1102 is booted up (i.e., started or restarted). This menu is loaded into the computer 1102, and the user is requested to choose between working modes, a public mode and a secured mode.

If the user chooses to work in the secured mode, then the computer provides this selection to the managing controller 1122 which, in turn, performs the following actions:

connects the secured area 1130 to the computer 1102;

denies access to the public area 1128;

provides communication switch 1140 with a command to enable connection between communication interfaces 1114 and 1116, thus connecting the computer 1102 and the secured network 1134; and provides communication switch 1142 with a command to deny any connection between communication interfaces 1110 communication and 1112, thus disconnecting the computer 1102 from the public network 1136.

If the user chooses to work in the public mode, then the computer provides this selection to the managing controller 1122 which, in turn, performs the following actions:

connects the public area 1128 to the computer 1102;

denies access to the secured area 1130;

provides communication switch 1142 with a command to enable connection between communication interfaces 1110 and 1112, thus connecting the computer 1102 and the public network 1136; and provides communication switch 1140 with a command to deny any connection between communication interfaces 1114 communication and 1116, thus disconnecting the computer 1102 from the secured network 1134.

According to the present invention, the device is operable on one of these two modes, the public mode and the secured mode. The public area 1128 and the secured area 1130 each includes an entire operating system. A change of mode is possible only through resetting the computer 1102 and loading an operating system from the selected area, according to the selected mode.

Conventional software, such as programs designed for IBM-PC architecture, do not make any use of disk addresses which begin with 0,0,# except 0,0,1, which contains the primary partition table.

According to a non-limiting example of the present invention, the addresses beginning with 0,0,1 include the partition table of the secured area 1130, the addresses beginning with 0,0,2 include the menu procedure, the addresses beginning with 0,0,3 include the partition table of the public area 1128, the addresses beginning with 0,0,4 include a pointer to the log area 1132 and the addresses beginning with 0,0,5 include the password area 1133.

According to the present example, the managing controller 1122 denies all write access to the addresses beginning with 0,0,2, which include the menu procedure. It will be noted that, physically, the device controls all access to all addresses and is able to provide the computer 1102 with various access types such as read, write and the like of selected addresses.

This arrangement provides considerable protection to the areas of the storage unit, which are associated to addresses 0,0,2 and higher when the storage unit 1124 is connected directly to another computer which does not have a managing controller. It will be appreciated that this arrangement is most suitable for portable hard disk drives.

According to the present example, the device 1100 detects when the computer 1102 is reset and, at that point, provides access to the menu area 1126. When the device 1100 receives the mode selection from the computer, it resets the computer physically and connects it to either the public area 1128 or to the secured area 1130, according to the selected mode.

In conventional computer systems, the operating system can be loaded from several alternative sources which, for example, are the local hard disk drive, a diskette drive, the CD-ROM drive, a network connected to the computer and the like. According to the present invention, some of these sources are predetermined as unauthorized to provide an operating system and thus are disabled from doing so.

In the present example, the device 1100 can be adapted to secure the computer 1102 from accidental loading of an operating system which is received from an unauthorized source.

In the present example, the device 1100 controls the access to a diskette drive 1135 which otherwise would be connected directly to the computer 1102. When the computer requires loading of an operating system, the managing controller 1122 detects this request and accordingly provides I/O switching unit 1139 with a command to disconnect between diskette drive input-output (I/O) interfaces 1137 and 1138, thus denying access to diskette drive 1135.

After the computer 1102 commences loading an operating system from storage unit 1124, the managing controller 1122 provides I/O switching unit 1139 with a command to connect between diskette drive input-output (I/O) interfaces 1137 and 1138, thus enabling the computer 1102 to access the diskette drive 1135.

According to a further aspect of the present invention (not shown), in which the diskette drive 1135 is connected directly to the computer 1102, the managing controller 1122 measures the time period $T_{measured}$ between computer boot-up and loading of an operating system.

The access and data transfer rate provided by a hard disk drive are considerably faster than those provided by a diskette drive. Furthermore, initial access to a diskette drive, before an operating system was loaded, is considerably slower, compared with hard disk drives. Hence, $T_{measured}$ would be considerably greater when accessing a diskette drive compared with accessing a hard disk drive.

$T_{boot}$ is a predetermined value which represents a predetermined maximal time period required to load an operating system from a hard disk drive. $T_{boot}$ of a hard disk drive is shorter than that of a diskette drive. Thus, if $T_{measured} \geq T_{boot}$, then the managing controller 1122 detects that an unauthorized loading of an operating system is in progress and hence, may take several preventive measures, such as denying all access to storage unit 1124.

When the managing controller 1122 detects a diskette drive boot attempt, it may operate to halt all operations and provide an alarm, using the computer 1102 multi-media capabilities or an external alarm device and the like.

Furthermore, the managing controller 1122 can provide computer 1102 with a command which will disable operations therein, either fully or partially. For example, the managing controller 1122 can provide computer 1102 with a constant boot command.

Display 1144 indicates the current mode of the device. Display 1144 is adapted to be attached to the computer 1102 to be seen by the user. According to one aspect of the invention, display 1144 is a light emitting diode (LED) or a LED array which either blinks differently or changes color in various modes. According to the invention, display 1144 can also be a liquid crystal display (LCD) array, displaying alpha-numerical messages and the like.

It will be noted that, according to another aspect of the invention, the managing controller 1122 detects all data received from the diskette drive 1135, thereby enabling operating system loading access thereto in predetermined cases, such as maintenance. Operating system loading access to diskette drive 1135, may be provided to the computer 1102 only if a predetermined password is provided thereto while executing the menu procedure.

Figure 15:
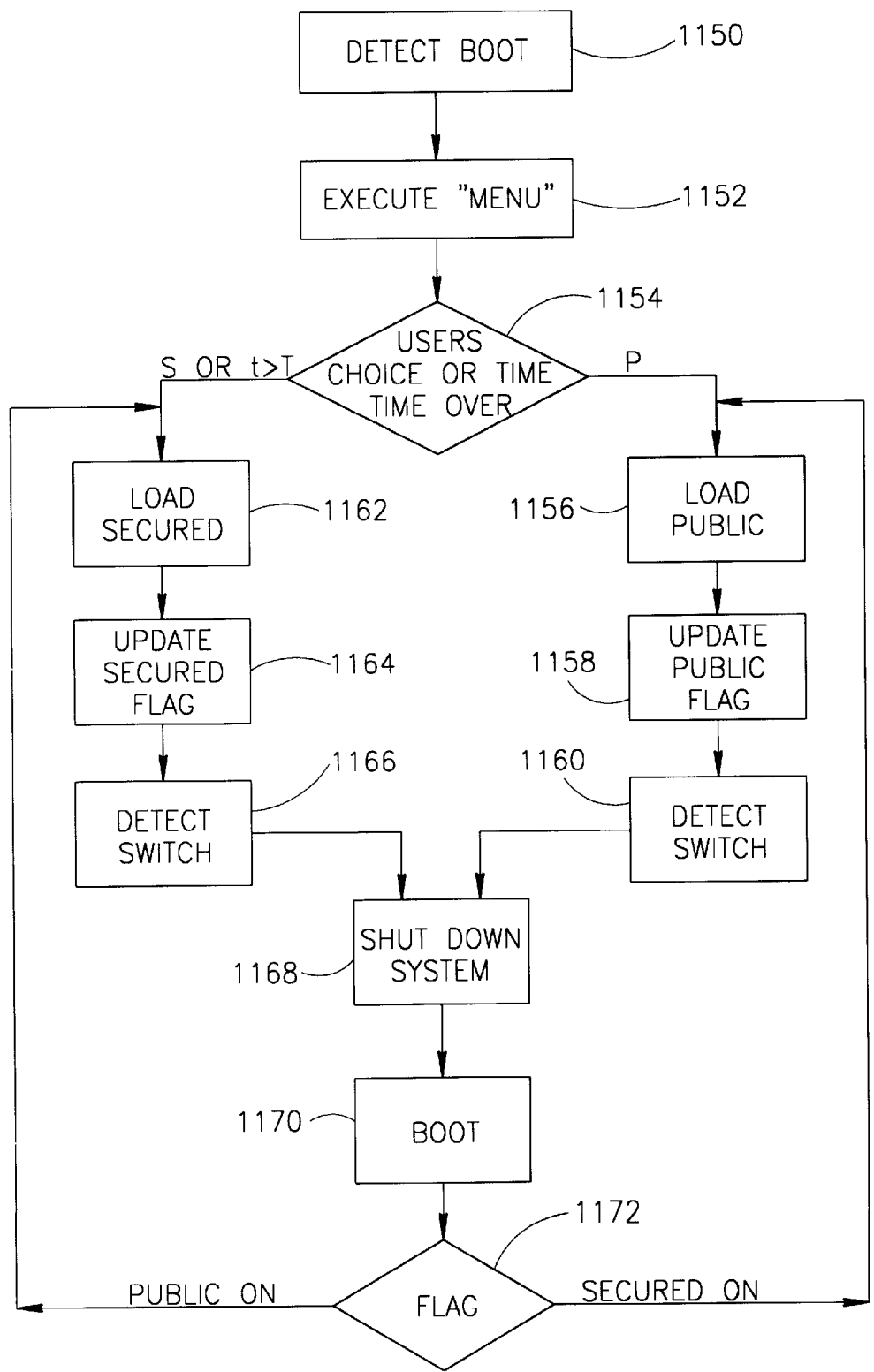
FIG. 15 is a schematic diagram of a method for operating an I/O and communication controlling device so as to provide limited data and communication access to a computer, operative in accordance with another preferred embodiment of the invention.

Reference is now made to FIG. 15 which is a schematic diagram of a method for operating device 1100 so as to provide limited data and communication access to a computer, operative in accordance with another preferred embodiment of the invention.

In step 1150, the managing controller 1122 detects a boot signal provided by the computer 1102. This signal is provided when the user manually boots up the computer or when the computer is turned on. According to the present example, the managing controller 1122 regards the first attempt to access address 0,0,1, via the disk drive I/O interface 1118, as a boot signal.

In step 1152, the managing controller 1122 provides the computer 1102 with access to the menu area 1126. The computer 1102 retrieves the menu software therefrom, executes it and proceeds to step 1154.

In step 1154, the managing controller 1122 awaits to receive instructions from the user, via the computer 1102, choosing between the various options of modes (i.e. public, secured and the like). At the same time, the managing controller 1122 resets a time counter t. The user is required to provide his selection within a predetermined time period T. If t>T, (i.e. the user did not provide his selection within a predetermined time period T) or the user selects the secured mode, then the managing controller 1122 proceeds to step 1162. Otherwise, the managing controller 1122 proceeds to step 1156.

In step 1156, the managing controller 1122 executes a sequence of operations which determine the public mode, such as enabling access to public devices and denying access to non-public devices, such as secured devices. Accordingly, the managing controller 1122 connects between the public area 1128 and the computer 1102, thus enabling the computer 1102 to load an operating system from the public area 1128. The managing controller further provides communication switch 1142 with a command to connect communication interfaces 1110 and 1112 thus, connecting between the public network 1136 and the computer 1102.

In step 1158, the managing controller 1122 turns on a public data flag and turns off a secured flag. In the present example, both flags are memory elements within managing controller 1122. The public data flag indicates that the current mode is the public mode. The secured data flag indicates that the current mode is the secured mode.

In step 1160, the managing controller detects if the user has provided the computer 1102 with a command to switch to another mode. If so, the managing controller proceeds to step 1168.

In step 1162, the managing controller 1122 executes a sequence of operations which determine the secured mode, such as enabling access to secured devices and denying access to non-secured devices, such as public devices. Accordingly, the managing controller 1122 connects between the secured area 1130 and the computer 1102, thus enabling the computer 1102 to load an operating system from the secured area 1130. The managing controller further provides communication switch 1140 with a command to connect communication interfaces 1114 and 1116 thus, connecting between the secured network 1134 and the computer 1102.

In step 1164, the managing controller 1122 turns on the secured data flag therein and turn off the public flag.

In step 1166, the managing controller detects if the user has provided the computer 1102 with a command to switch to another mode. If so, then the managing controller proceeds to step 1168.

In step 1168, the managing controller 1122 provides an operating system shut-down-restart command to the computer 1102. Accordingly, the computer shuts down all applications as well as the operating system and restarts thereafter. Then, the managing controller 1122 proceeds to step 1170.

In step 1170, the managing controller 1122 resets the computer 1102. According to one aspect of the invention, this reset may be performed by providing a further software boot command to the computer 1102. According to another aspect of the invention, the reset is performed by providing a hardware boot command to the computer 1102. It is noted that, when reset, X86 based PC computers reset most of the RAM except for the first Mbyte of memory, which may include undesired software. According to a further aspect of the invention, the managing controller 1122 provides a reset-all-RAM command to the computer 1102. After executing step 1170, the managing controller 1122 proceeds to step 1172.

In step 1172, the managing controller retrieves the current setting of the security flag and the public flag. If the security flag is turned on and the public flag is turned off, then the managing controller proceeds to step 1156, so as to switch from the secured mode to the public mode. Otherwise, if the security flag is turned off and the public flag is turned on, then the managing controller proceeds to step 1162, so as to switch from the public mode to the secured mode. It is noted that when the system determines more than two modes, such as a plurality of modes which define multi-level, multi-user, multi-client situations, the user is required to provide his mode selection.

Accordingly, the device 1100 can be adapted to support a plurality of multiple level security modes, switching between them and enabling or disabling access to a variety of devices, links and data locations, respectively.

It is noted that in steps 1156 and 1162, after the computer 1102 commences loading the operating system from the chosen area, the managing controller 1122 provides I/O switching unit 1139 with a command to connect between diskette drive input-output (I/O) interfaces 1137 and 1138, thus enabling the computer 1102 to access the diskette drive 1135.

According to another aspect of the invention, a secured storage area contains a master boot record (MBR) and performs as a clean media instead of a removable rescue diskette, which, according to common practice, may not be available when required.

Figure 16:
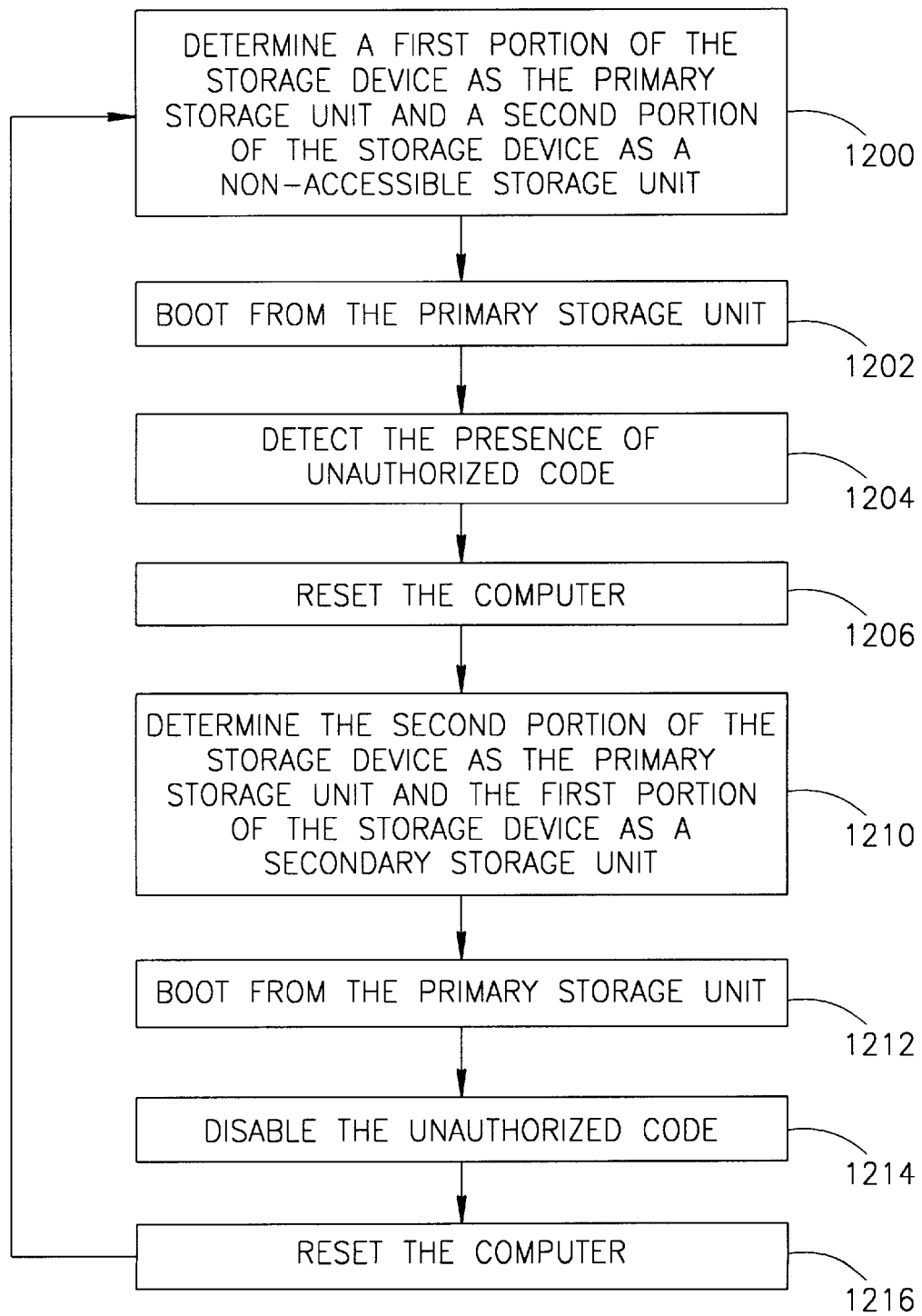
FIG. 16 is a schematic illustration of a method for operating a device of the invention, controlling a secure storage area and a public storage area, each containing a master boot record, operative in accordance with yet another preferred embodiment of the invention.

Reference is now made to FIG. 16, which is a schematic illustration of a method for operating a device of the invention controlling a secure storage area and a public storage area, each containing an MBR, operative in accordance with yet another preferred embodiment of the invention. In the present example, the method is implemented for operating device 1100 of FIG. 14.

In the present example, both the public area 1128 and the secured area 1130, contain operating system boot files.

In step 1200 the device determines a first portion of the storage area as a primary storage unit and a second portion of the storage area device is a non accessible storage unit. In the present example the controller 1122 determines the public storage area 1128 as the primary storage unit and denies any access to the secured storage area 1130. In conventional PC system, the public area 1128 would appear as drive C:.

It will be noted that conventional PC systems are usually defined so that drive C: is the drive from which the system boots up (i.e. loads an operating system). Furthermore, determining a storage unit non-accessible can be performed by denying all access to the storage unit, making it read only and the like, as long as any data modification operation is denied for that storage unit.

In step 1202 the device 1100 boots from the primary storage unit. In the present example the controller 1122 introduces the public storage area 1128 to the computer 1102 via IO interfaces 1118 and 1120, as drive c and the computer 1102 loads an operating system from the public storage area 1128.

In step 1204 the computer 1102 detects the presence of unauthorized code. Unauthorized code can be detected in many ways, such as detecting access attempts, comparing data masks, and the like. It will be noted that detection of such unauthorized code can be performed using anti-virus software and the like. In the present example, the computer provides this information to the device 1100, although such information can be provided by a user or by the device itself when operative to detect such unauthorized code.

In step 1206 the computer is reset. It will be noted that such reset command can be provided by the unauthorized code detecting software as well as from the user operating the computer 1102.

In step 1210, the second portion of storage device is determined as the primary storage unit and the first portion of the storage device is determined as the secondary storage unit. In the present example controller 1122 determines the secured storage area 1130 as the primary storage unit and the public storage area 1128 as the secondary storage unit. Accordingly, the device 1100 provides the secured storage area 1130 as drive C: to the computer 1102.

The device 1100 also provides public storage area 1128 as drive D: to the computer 1102.

In step 1212 the computer boots from the primary storage unit which now is the secured storage area. In the present example, computer 1102 regards the secured storage area 1130 as drive C: and boots therefrom.

In step 1214 the unauthorized code element, detected in step 1204 is disabled. In the present example the computer 1102 executes the virus cleaning software which is originally stored in the secured area 1103, so as to remove the unauthorized code element (i.e. virus software) from the public storage area 1128.

In step 1216 the computer is reset again so as to return to the original setting wherein the public storage area 1128 is determined as the primary storage unit and the secured storage area is predetermined as a non accessible storage unit.

In accordance with another aspect of the present invention the MBR of the secured mode is contained within the managing controller 1122. It will be noted that the managing controller 1122 may include an internal storage area or an external storage area, such as an EEPROM and the like.

According to a further aspect of the invention, the activation of the clean boot mode, as described in FIG. 16, can be done on a timely basis, at predetermined intervals.

The present invention provides several alternate methods and systems which provide switching between networks. One of these methods provides switching, which is performed at the network switching hub. According to this aspect of the present invention, the user is connected to the switching element via a single communication connection and does not have to include multiple network communication interfaces for connecting to various networks.

Figure 17:
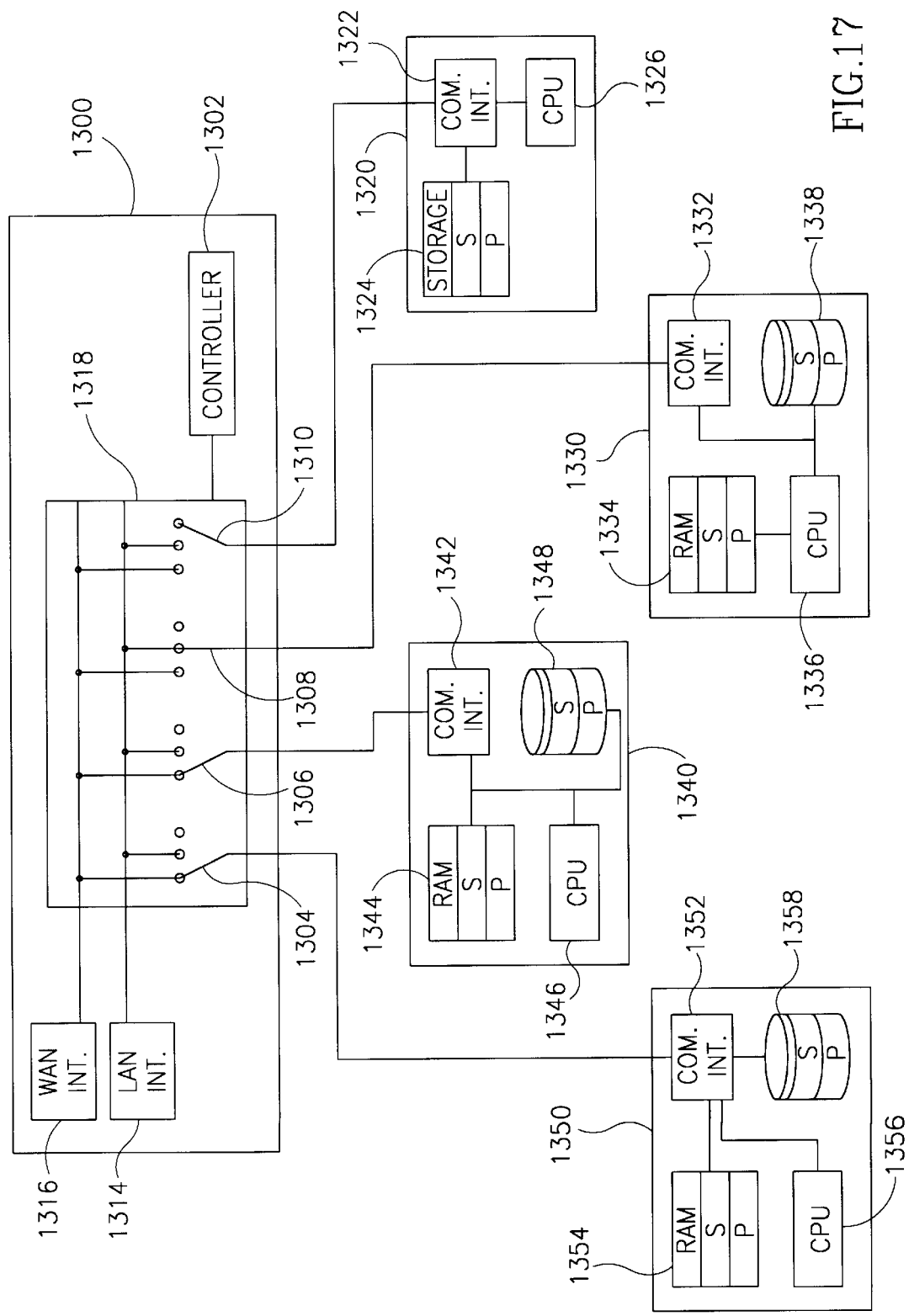
FIG. 17 is a schematic illustration of a security system, constructed and operative in accordance with another preferred embodiment of the present invention.

Reference is now made to FIG. 17, which is a schematic illustration of a system, generally referenced 1300, constructed and operative in accordance with another preferred embodiment of the present invention.

System 1300 includes a WAN communication interface 1316, a LAN communication interface 1314, a switching array 1318 including a plurality of switching elements 1304, 1306, 1308 and 1310, and a controller 1302.

A plurality of user stations 1320, 1330, 1340 and 1350 are connected to system 1300, each at a selected switching element 1310, 1308, 1306 and 1304 respectively.

User station 1320 includes a communication interface 1322, a CPU 1326 and a storage unit 1324, both connected to the communication interface 1322. The storage unit 1324 includes among others, a secured storage area, designated S and a public storage area, designated P.

User station 1330 includes a communication interface 1332, a storage unit 1338 having a secured storage area and a public storage area, a random access memory unit 1334, having a secured memory area and a public memory area and a CPU 1336, connected to the communication interface 1332, the storage unit 1338 and the memory unit 1334.

User station 1340 includes a communication interface 1342, a storage unit 1348 having a secured storage area and a public storage area, a random access memory unit 1344, having a secured memory area and a public memory area and a CPU 1346, all connected therebetween.

User station 1350 includes a communication interface 1352, a storage unit 1358 having a secured storage area and a public storage area, a random access memory unit 1354, having a secured memory area and a public memory area and a CPU 1356, all connected to the communication interface 1352.

Each of the switches 1304, 1306, 1308 and 1310 is operative to provide several connection modes to the user station connected thereto, as follows:

According to a first mode, the switch 1304 connects the user station 1350 to the WAN interface 1316, thereby providing Wan communication services. According to a second mode, the switch 1304 connects the user station 1350 to the LAN interface 1314, thereby providing LAN communication services. According to a third mode, the switch 1304 disconnects the user station 1350 from any of the communication interfaces, thus determining the user station a stand alone unit.

According to the present embodiment, each user station provides a request to system 1300, for connecting according to one of the above modes. It will be noted that in the present example, a user station requesting to be connected via the WAN interface 1316, has to exclude access to the secured storage and memory areas therein, whereas a user station requesting to be connected via the LAN interface 1314, has to exclude access to the public storage and memory areas therein.

In the case of user station 1350 and 1340, the controller 1302 detects if the requesting user station is configured according to the requested mode. If so, then, the controller provides a command to the switching array 1318 to operate the respective switching element 1304 or 1306, so as to switch according to the requested mode.

Otherwise, the controller 1302 provides command to the switching array, either to maintain the current setting of the respective switching element or operate according to the third mode, where the requesting user station is disconnected from both communication interfaces 1304 and 1314.

In the case of user station 1320, the communication interface includes therein, actively controls the switching element 1310 of switching array 1318, so as to operate according to a predetermined mode.

It will be noted that the terms WAN and LAN are provided by way of example. Basically, the system 1300 provides switching between a plurality of communication networks of any given type, as well as network devices.

In the same manner, the storage components in each of the user stations can be divided into as many sub areas, such a plurality of secured storage areas, each at a different level of security, for connecting to predetermined networks or network devices, rescue storage area, log storage area and the like. Each of the network connections, provided by the switching system, defines an accessibility configuration. The requesting station has to be configured according to this specified configuration, before connecting it to the requested network connection, associated therewith.

Moreover, the number of communication networks, which can be connected and switched by the system 1300 depends on the structure of the basic switching element of the switching array.

Figure 18A:
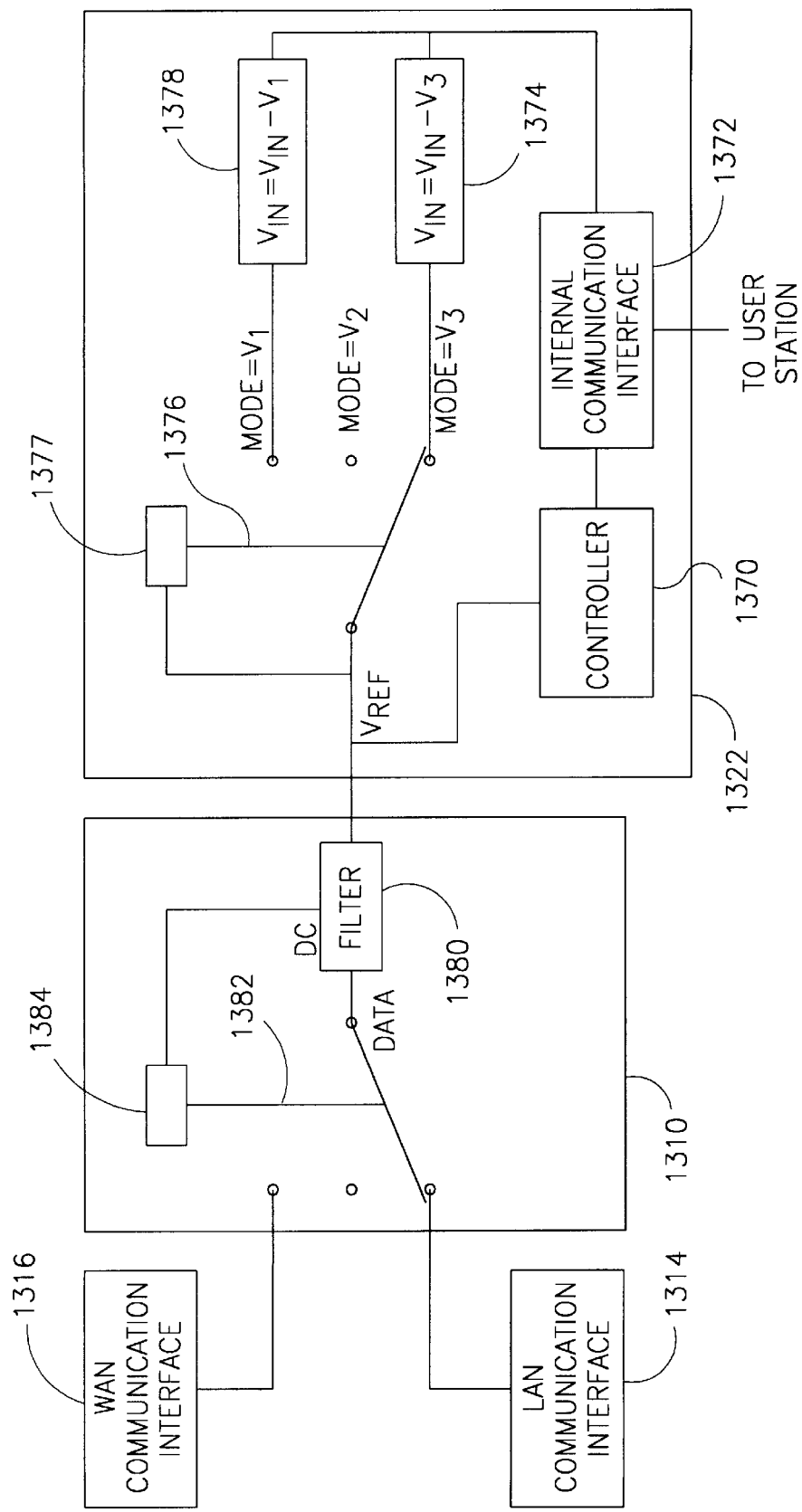
FIG. 18A is a schematic illustration in detail of a communication interface of FIG. 17.

Reference is now made to FIG. 18A, which is a schematic illustration in detail of communication interface 1322 and switching element 1310 of FIG. 17.

Communication interface 1322 includes a controller 1370, an internal communication interface 1372, two voltage adjusting units 1378 and 1374 and a relay 1376. The controller 1370 is connected to the internal communication interface 1372 and to the common connection of the relay 1376, which is further connected to a relay controlling unit 1377. The internal communication interface 1372 is further connected to the voltage adjusting units 1378 and 1374. The voltage adjusting unit 1378 is further connected to a first switchable end of the relay 1376. The second switchable end of the relay 1376 determines a disconnected mode of operation. The voltage adjusting unit 1374 is further connected to the third switchable end of the relay 1376.

Switching element 1310 includes a relay 1382 and a filtering unit 1380, connected thereto. The first switchable end of the relay 1382 is connected to the WAN via the WAN communication interface 1316. The second switchable end of the relay 1382 is not connected to any network. the third switchable end of the relay 1380 is connected to the LAN via the LAN communication interface 1314.

The filtering unit 1380 transfers data from the relay 1382 towards relay 1376. The filtering unit 1380 further filters a signal received from communication interface 1322, so as to provide the direct current (DC) portion thereof to the relay controlling unit 1384 and the data portion incorporated in the received signal, to the common end of the relay 1382.

The internal communication interface 1372 is further connected to the various components of the user station 1320 (not shown), providing communication thereto and receiving commands therefrom.

When the user station 1320 provides a request to the communication interface 1322 to operate according to the first mode, where it will be connected to the WAN, then, the controller 1370 verifies that the user station 1320 is configured accordingly and then, provides a reference voltage $V_{REF}$ to the relay 1376. The relay 1376 then, connects the common end with the switchable end, corresponding with the value of the reference voltage $V_{REF}$.

It will be noted that the same reference voltage is further combined with any data currently being transferred between the switching element 1310 and the communication interface 1322.

The filter 1380 separated the DC portion (reference voltage $V_{REF}$) of the signal received at the switching element 1310 and provides it to the relay controlling unit 1384, which, in turn, connects its common end with one of its switchable ends, which corresponds with the value of the reference voltage $V_{REF}$.

Accordingly, when $V_{REF}=V_1$, both relays will connect their common ends with their first switchable end, thereby providing WAN access to the communication interface 1322. It will be noted that any signal received at the communication interface 1322 includes data portion as well as DC portion having a value of $V_1$.

In order to provide the user station with a pure data signal, the adjusting unit 1378, subtracts a DC portion having a value of $V_1$ from the signal received from the relay 1376, thereby obtaining a pure data signal, which is then provided further to the internal communication interface 1372 for further transferring to the user station 1320.

The same applies to the second mode, in which the controller 1370 provides a DC voltage, having a value of $V_3$, operating the relays 1376 and 1382 to connect their respective third switchable end to their respective common end. Communication interface 1322 and the switching element 1310 in a similar manner with the respective $V_3$ voltage value.

The main difference in this case, is that the adjusting unit 1374 subtracts a DC portion having a value of $V_3$ from the signal received from the relay 1376, thereby obtaining a pure data signal, which is then provided further to the internal communication interface 1372 for further transferring to the user station 1320.

Finally, when the controller 1370 provides a DC voltage having a value of $V_2$, then both relays 1382 and 1376 connect their common end to their respective second switchable end, thereby disconnecting any data transfer between the communication interface 1322 and any of the communication interfaces 1316 and 1314.

Accordingly, the instructions as to the selected mode of communication are physically separated from any data which is transferred between the system 1300 and any of the user stations.

It will be noted that the present invention is not limited to any type of relay element, electromechanical, solid state and the like.

Figure 18B:
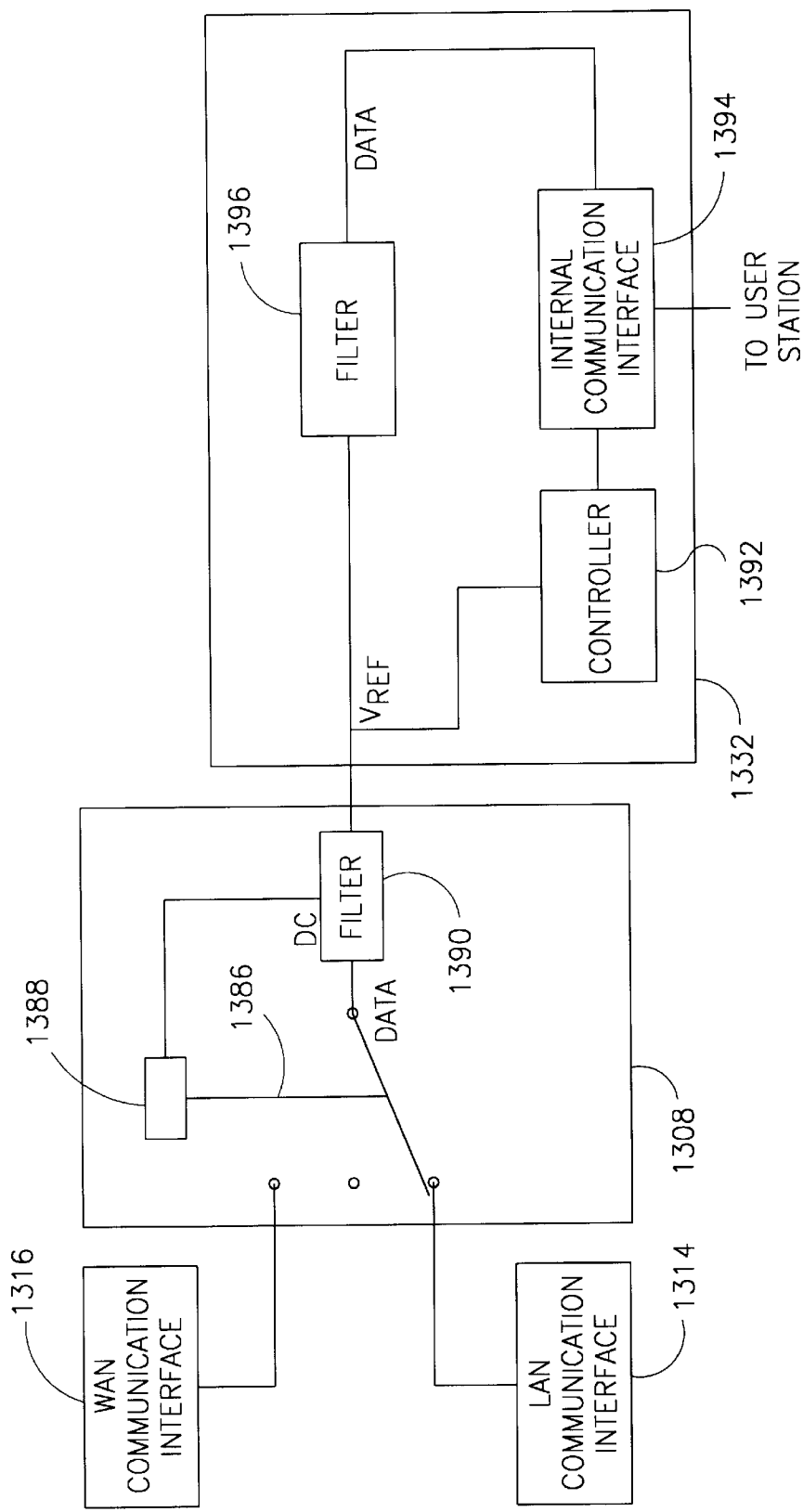
FIG. 18B is a schematic illustration in detail of another communication interface of FIG. 17.

Reference is now made to FIG. 18B, which is a schematic illustration in detail of communication interface 1332 and switching element 1308 of FIG. 17.

Communication interface 1332 includes a controller 1392, an internal communication interface 1394 and a filter 1396. The controller 1392 is connected to the internal communication interface 1394 and to the filter 1396, which is further connected to the relay controlling unit 1308 via a filter 1390. The internal communication interface 1394 is further connected to the filter 1396.

Switching element 1308 includes a relay 1386 and a filtering unit 1390, connected thereto. The first switchable end of the relay 1386 is connected to the WAN via the WAN communication interface 1316. The second switchable end of the relay 1386 is not connected to any network. the third switchable end of the relay 1386 is connected to the LAN via the LAN communication interface 1314.

The filtering unit 1390 transfers data from the relay 1386 towards filter 1396. The filtering unit 1390 further filters a signal received from communication interface 1332, so as to provide the direct current (DC) portion thereof to a relay controlling unit 1388 and the data portion incorporated in the received signal, to the common end of the relay 1386.

The internal communication interface 1394 is further connected to the various components of the user station 1330 (not shown), providing communication thereto and receiving commands therefrom.

When the user station 1330 provides a request to the communication interface 1332 to operate according to the first mode, where it will be connected to the WAN, then, the controller 1392 verifies that the user station 1330 is configured accordingly and then, provides a reference voltage $V_{REF}$ to the line connecting the two filters 1390 and 1396.

The reference voltage is combined with any data currently being transferred between the switching element 1308 and the communication interface 1332.

The filter 1390 separated the DC portion (reference voltage $V_{REF}$) of the signal received at the switching element 1308 and provides it to the relay controlling unit 1388, which, in turn, connects its common end with one of its switchable ends, which corresponds with the value of the reference voltage $V_{REF}$.

Accordingly, when $V_{REF}=V_1$, the relay 1386 will connect its common end with its first switchable end, thereby providing WAN access to the communication interface 1332. It will be noted that any signal received at the communication interface 1332 includes data portion as well as DC portion having a value of $V_1$.

In order to provide the user station with a pure data signal, the filter 1396 filters out the DC portion having a value of $V_1$ from the received signal, thereby obtaining a pure data signal, which is then provided further to the internal communication interface 1394 for further transferring to the user station 1330.

The same applies to the second mode, in which the controller 1392 provides a DC voltage, having a value of $V_3$, operating relay 1386 to connect its respective third switchable end to its respective common end.

Again, the filter 1396 filters the incoming signal thereby providing a pure data signal to the internal communication interface 1394, for further transferring to the user station 1330.

Finally, when the controller 1392 provides a DC voltage having a value of $V_2$, then relay 1386 connects its common end to its second switchable end, thereby disconnecting any data transfer between the communication interface 1332 and any of the communication interfaces 1316 and 1314.

Filtering units 1390 and 1396 as well as filtering unit 1380 (FIG. 18A) can be implemented in a variety of elements such as semiconductor devices, transforming coils and the like.

Furthermore, the combination interfaces provided in FIGS. 18A and 18B provide communication switching, which is independent of the type of communication network, analog, digital and the like.

Figure 19:
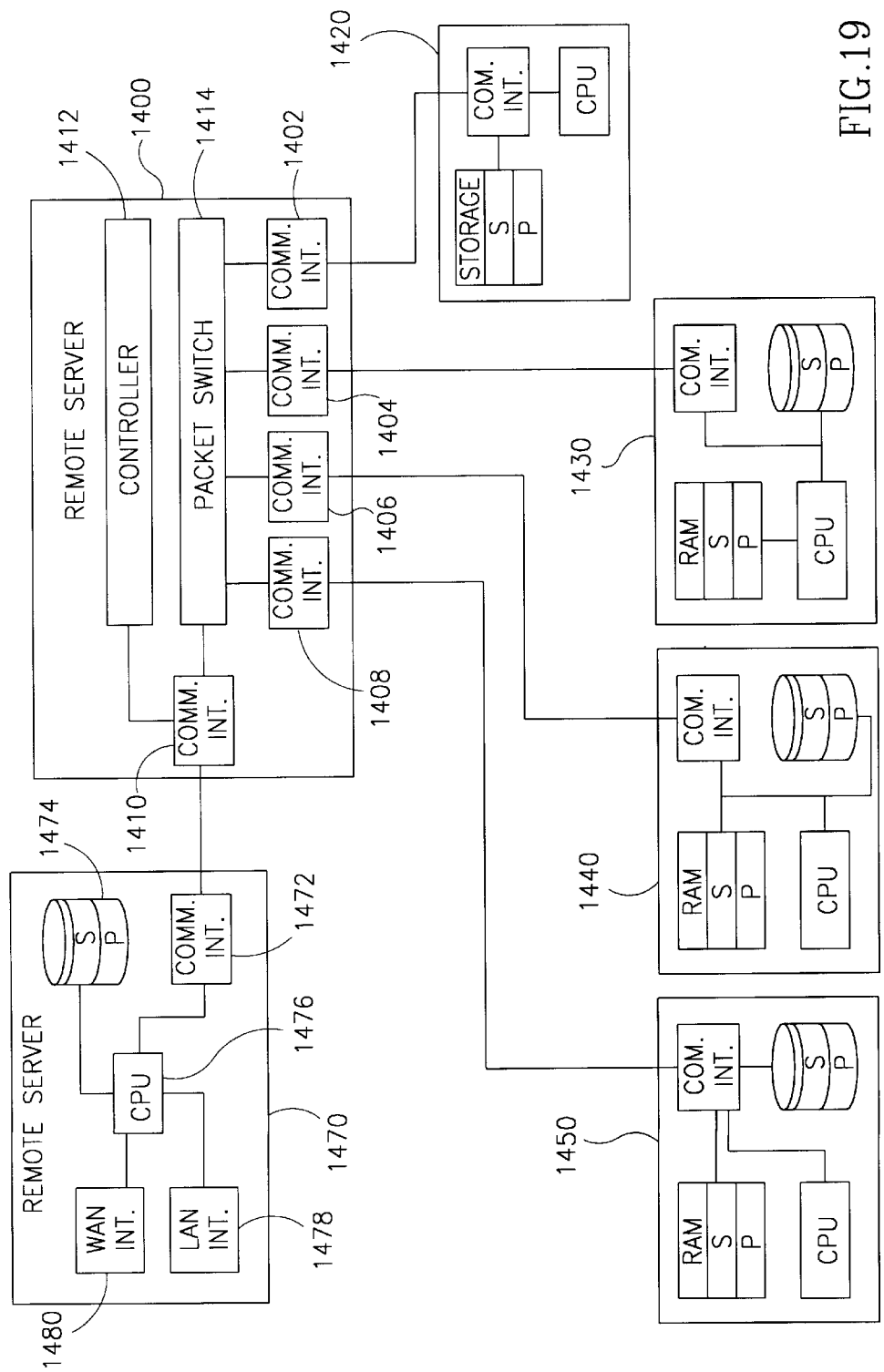
FIG. 19 is a schematic illustration of a secured switching system, constructed and operative in accordance with a further preferred embodiment of the invention.

Reference is now made to FIG. 19, which is a schematic illustration of a secured switching system, generally referenced 1400, constructed and operative in accordance with a further preferred embodiment of the invention.

System 1400 includes a controller 1412, a packet switch 1414, connected to the controller 1412, a plurality of node communication interfaces 1402, 1404, 1406 and 1408 for connecting to user stations, all connected to the packet switch 1414 and a communication interface 1410 for connecting to a remote server 1470, connected to the controller 1412 and the packet switch 1414.

The remote server 1470 includes a WAN interface 1480, a LAN interface 1478, storage unit 1474, a local communication interface 1472 and a CPU 1476, connected to the WAN interface 1480, LAN interface 1478, storage unit 1474 and local communication interface 1472.

The system 1400 is further connected to a plurality of user stations 1420, 1430, 1440 and 1450, which are generally similar to user stations 1320, 1330, 1340 and 1350, of FIG. 17, respectively.

In the present example, the physical connection to an external network, is provided by the remote server 1470. The CPU 1476 uses the secure area of storage unit 1474 to store information in conjunction with the LAN and the public storage area of storage unit 1474 to store information in conjunction with the WAN. Both types of information are transferable to each of the user stations via system 1400, using packet based communication protocol.

Each of the user stations is capable of transmitting a request to the system 1400, to be connected either for communication according to a public mode, to the WAN communication interface 1480, for communication according to the secure mode, to the LAN communication interface 1478 or to be disconnected from network communication, according to a third mode.

When the system 1400 receives such a request, the controller 1412, detects that the requesting station is configured properly.

When the request is for connection according to the first communication mode, the controller 1412 verifies that the requesting station enables access to the public storage and memory areas therein and disables access to the respective secure areas.

Then, the controller 1412 provides a command to the packet switch 1414 to enable communication of "public" data packets between the remote server 1470 and the requesting user stations. Such public data is associated with the public storage area of storage unit 1474 and the WAN interface 1480.

When the request is for connection according to the second communication mode, the controller 1412 verifies that the requesting station enables access to the secured storage and memory areas therein and disables access to the respective public areas.

Then, the controller 1412 provides a command to the packet switch 1414 to enable communication of "secure" data packets between the remote server 1470 and the requesting user stations. Such secure data is associated with the secure storage area of storage unit 1474 and the LAN interface 1480.

When the request is for connection according to the third communication mode, the controller 1412 provides a command to the packet switch 1414 to disable any data connection to and from the respective user station.

It will be noted that the system 1400 and the remote 1470 can be located at spaced apart locations or incorporated in the same housing. At each such case, the respective communication interfaces 1410 and 1472 have to be adequately configured.

It will further be noted that the present invention is not limited to the relay switching (FIG. 17) or packet switching, as methods for separating between a plurality of communication signals, each originated in connection with a different peripheral device or network. Other method may also apply such as multiplexing, frequency separation, code separation (such as in CDMA) and the like.

Figure 20:
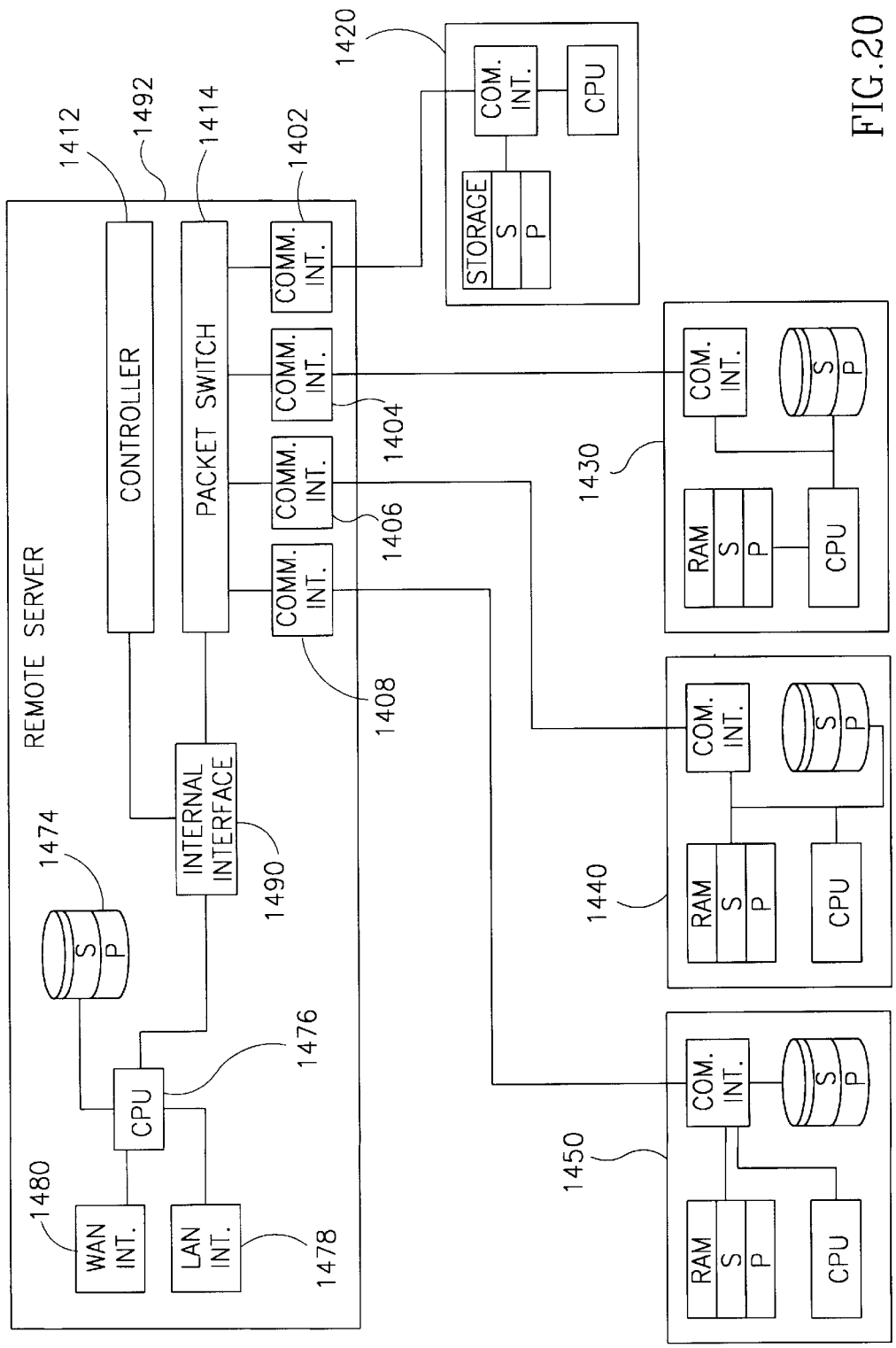
FIG. 20 is a schematic illustration of a combined server and switching system, constructed and operative in accordance with another preferred embodiment of the present invention.

Reference is now made to FIG. 20, which is a schematic illustration of a combined server and switching system, generally referenced 1492, constructed and operative in accordance with another preferred embodiment of the present invention.

As can be seen from FIG. 20, the system a respective combination of all of the components of the remote server 1470 and the system 1400 of FIG. 19, but without communication interfaces 1474 and 1410, which, in the present example are replaced with an internal interface 1490.

It will be noted that the internal interface 1490 can be any form of conventional connection between close by, otherwise integrated units, such as a bus, a direct continuous connection and the like.

According to a further aspect of the present invention, there is provided a system for switching between any number of peripheral devices.

Figure 21:
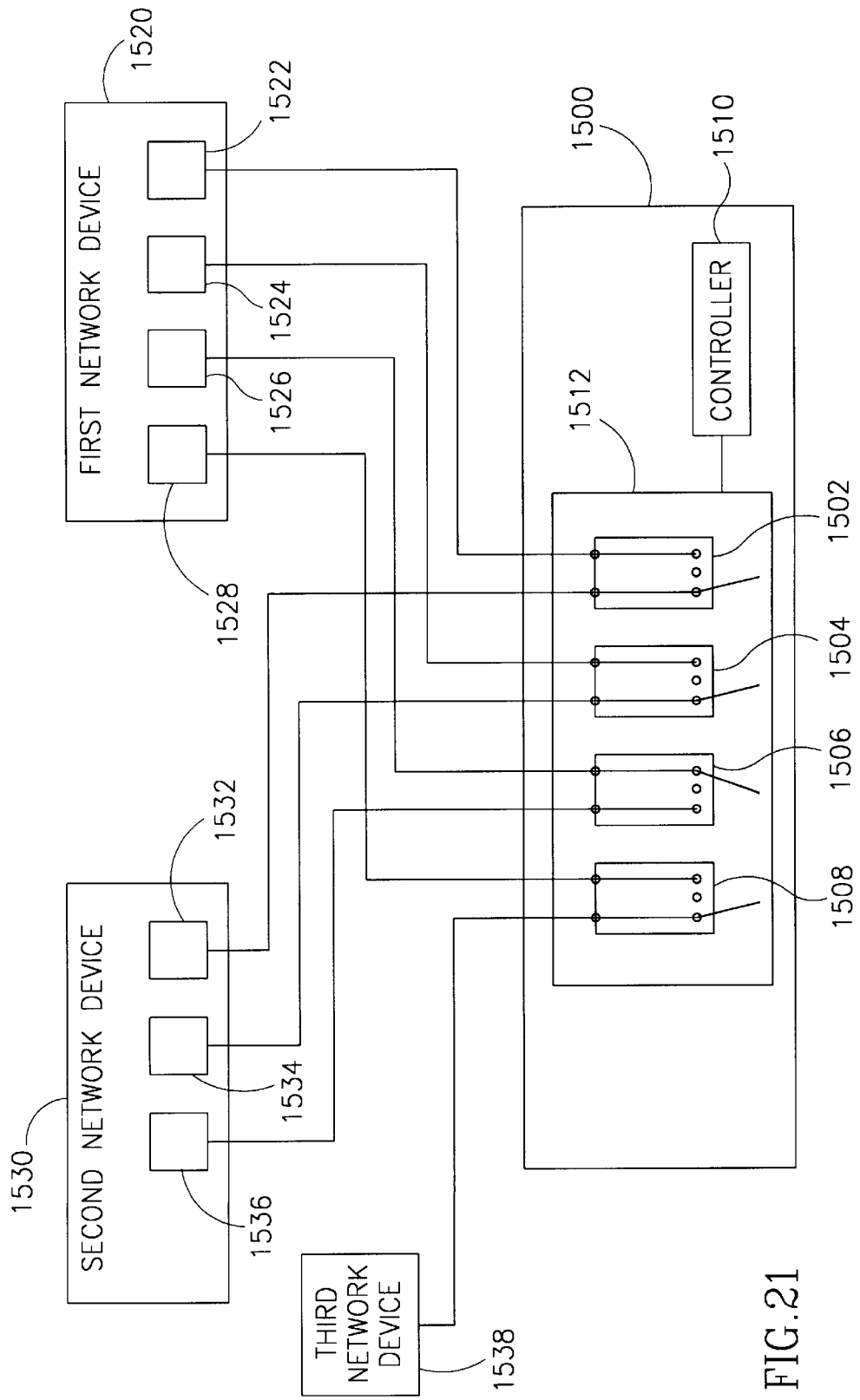
FIG. 21 is a schematic illustration of a secured switching system, and three network devices, connected thereto, constructed and operative in accordance with yet another preferred embodiment of the present invention.

Reference is now made to FIG. 21, which is a schematic illustration of a secured switching system, generally referenced 1500, and three network devices, connected thereto, constructed and operative in accordance with another preferred embodiment of the present invention.

System 1500 includes a controller 1510 and a switching array 1512 connected thereto. The switching array 1512 includes a plurality of switching elements 1502, 1504, 1506 and 1508, each capable of three switching modes.

A first network device 1520 provides connection to a secured network and includes a plurality of output ports 1522, 1524, 1526 and 1528, for connecting to user stations.

A second network device 1530 provides connection to a public network and includes a plurality of output ports 1532, 1534 and 1536 for connecting to user stations.

A third network device 1538 provides connection to a peripheral data device. It will be noted that any of the three network devices can be adapted to connect to any type of network or device.

According to the invention port 1538 is connected to the first switching end of switching element 1508, while port 1528 is connected to the third switching end of switching element 1508. This way, switching element 1508 is capable of connecting a user station, connected thereto, to either the third network device 1538 or the first network device 1520.

Similarly port 1532 is connected to the first switching end of switching element 1502, while port 1522 is connected to the third switching end of switching element 1502. Port 1534 is connected to the first switching end of switching element 1504, while port 1524 is connected to the third switching end of switching element 1504. Port 1536 is connected to the first switching end of switching element 1506, while port 1526 is connected to the third switching end of switching element 1506.

Accordingly, the present invention provides a simple structure which utilizes existing equipment, without interfering with any transmitted data.

Figure 22:
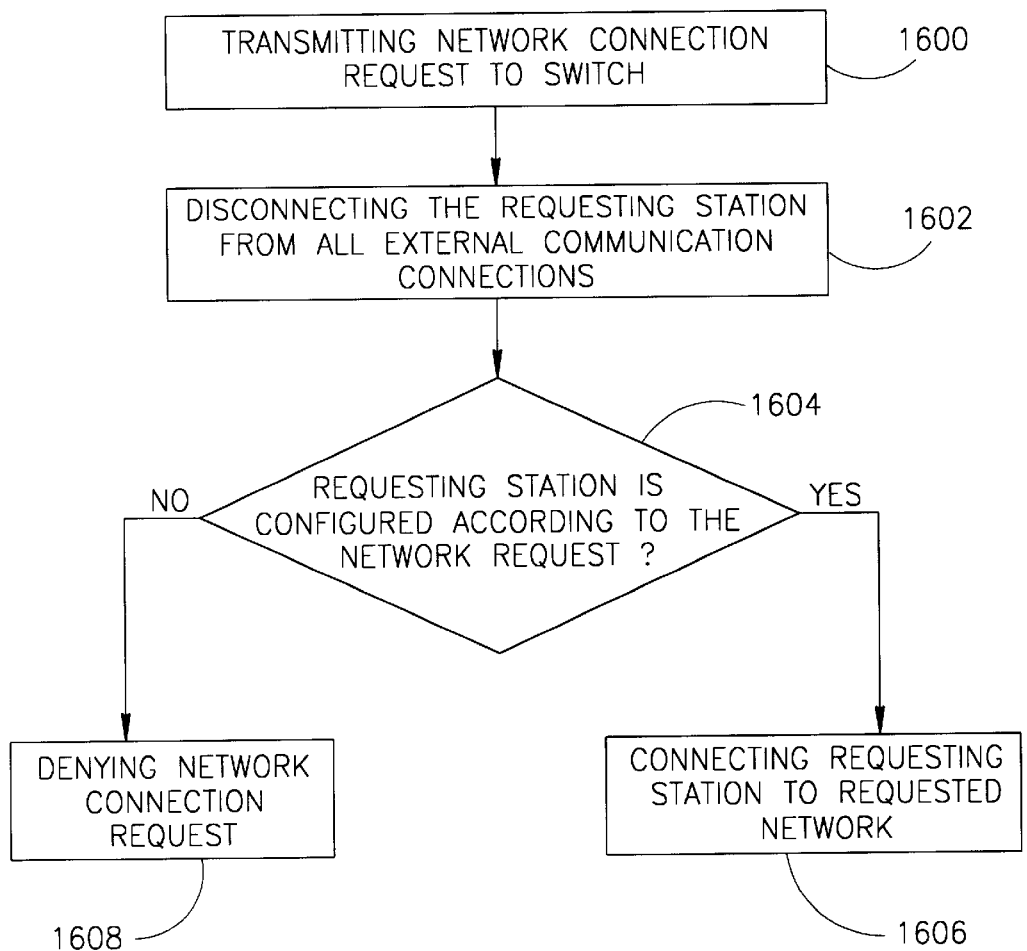
FIG. 22 is a schematic illustration of a method for operating the systems shown in FIGS. 17, 18, 19, 20 and 21, operative in accordance with a further preferred embodiment of the invention.

Reference is now made to FIG. 22 which is a schematic illustration of a method for operating the systems shown in FIGS. 17, 18, 19, 20 and 21. The present example is presented for system 1300. It will be noted that the method set forth is applicable to any of the above system 1300, 1400 and 1500.

In step 1600, a user station transmits a network connection request, which can be either connecting to a selected network or disconnecting from all communication connections.

In step 1602, the requesting user station is disconnected from all external communication connections. This step can be performed by a switching element within the switching system or within the communication interface of the requesting station, such as communication interface 1322.

In step 1604, the requesting station is scanned so as to determine if it is configured according to the network request. If so, then the requesting station is connected to the requested network (step 1606). Otherwise, the requesting station is denied the requested network connection (step 1608).

It will be noted that the scanning step 1604 can be performed by the controller on the switching system end or by the controller of the communication device on the requesting station end, such as communication interface 1322.

It will be appreciated that the invention as disclosed in FIGS. 17–22, significantly reduces the amount of network cables, by requiring a single cable between each of the user stations and the switching system, connected thereto. Furthermore, the present invention enhances central control over each station, via information available from the switching system for all of the stations connected thereto.

Figure 23A:
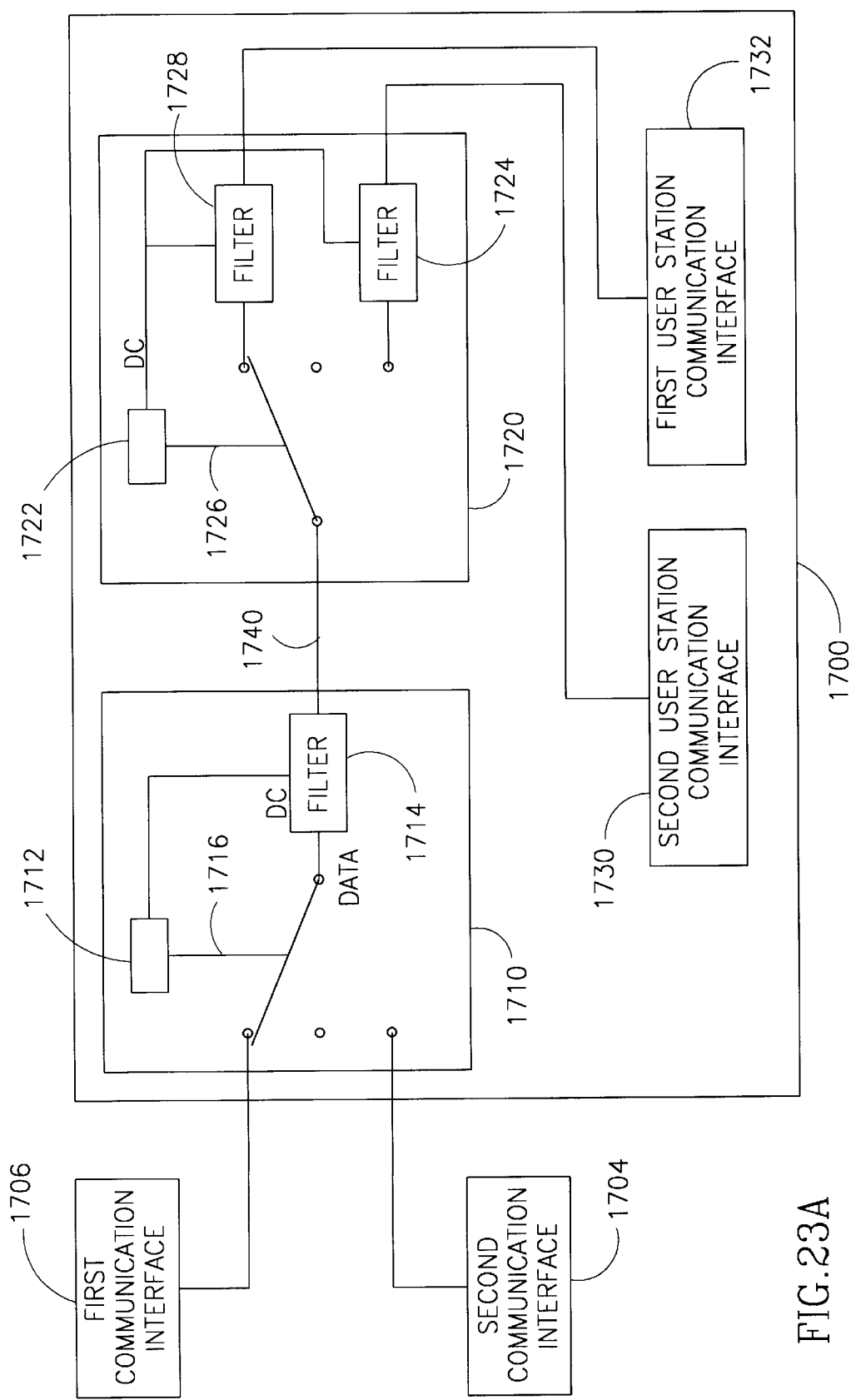
FIGS. 23A, 23B and 23C are schematic illustrations of a system for securing access of a plurality of users to a plurality of devices, constructed and operative in accordance with yet another preferred embodiment of the present invention.
Figure 23B:
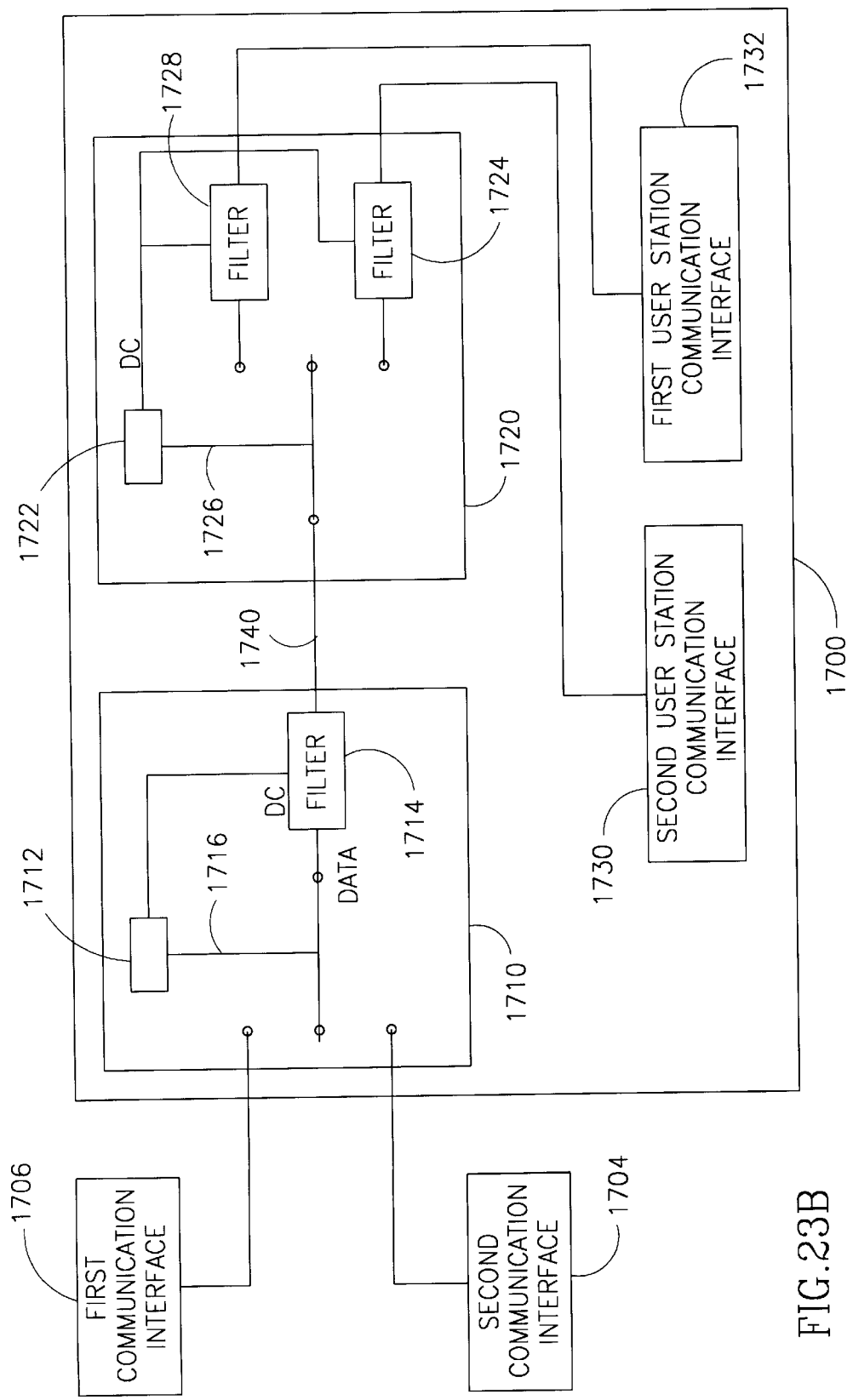
Figure 23C:
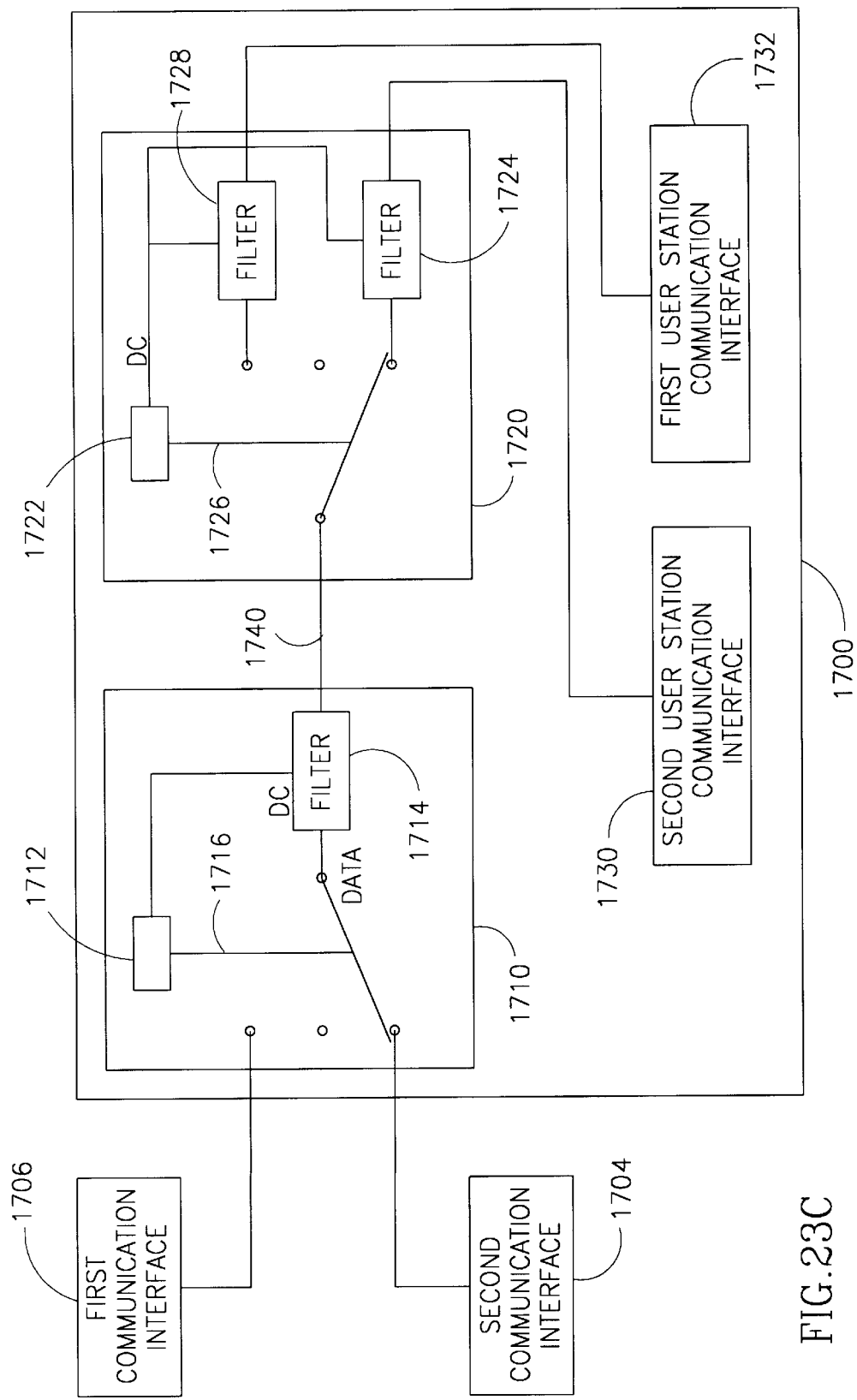

Reference is now made to FIGS. 23A, 23B and 23C, which are schematic illustrations of a system, generally designated 1700, for securing access of a plurality of users to a plurality of devices, constructed and operative in accordance with yet another preferred embodiment of the present invention.

System 1700 includes a remote switching element 1710, a local switching element 1720, connected to the remote switching element 1710 and two user station communication interfaces 1730 and 1732, connected to the local switching element 1720.

The remote switching element 1710 includes a relay 1716 and a filter 1714, connected therebetween. The DC output of filter switch 1714 is connected to the relay controlling unit 1712. The data input\output of the filter 1714 is connected to the common end of the relay 1716.

The local switching element 1720 includes a relay 1726 and two filters 1728 and 1724. Filter 1728 is connected to the first switchable end of the relay 1726 and filter 1724 is connected to the third switchable end of the relay 1726. The DC outputs of both filters 1728 and 1724 are connected to the relay controlling unit 1722.

Filter 1728 is further connected to the first user station communication interface 1732. Filter 1724 is further connected to the second user station communication interface 1730.

The filter 1714 is further connected, via a single communication line 1740, to the common end of relay 1726 of switching element 1720.

The remote switching element 1710 is further connected to a first communication interface 1706, via the first switchable end of the relay 1716 and to a second communication interface 1704, via the third switchable end of the relay 1716. Any one of communication interfaces 1706 and 1704 can be further connected to any type of peripheral device, such as a printer, scanner, server, network of any kind and the like.

The system 1700 provides connection of a single device, to a single user station, over a single communication line. Accordingly, system 1700 provides connection between the first communication interface 1706 to the first user station communication interface 1732, when both relays 1716 and 1726, connect their common ends to their respective first switchable ends (FIG. 23A).

System 1700 provides connection between the second communication interface 1704 to the second user station communication interface 1730, when both relays 1716 and 1726, connect their common ends to their respective third switchable ends (FIG. 23C).

Finally, system 1700 disconnects all connections of the user station interfaces 1730 and 1732, when both relays 1716 and 1726, connect their common ends to their respective second switchable ends (FIG. 23B).

This system is especially useful for connecting user stations and spaced apart devices, using fewer communication lines than would normally be required and still maintaining physical separation between the stations and their respective devices.

It will be appreciated by persons skilled in the art that the present invention is not limited to what has been particularly shown and described hereinabove. Rather the scope of the present invention is defined only by the claims which follow.

What is claimed is:

1. System for securely connecting at least one computer station to a plurality of communication devices, the system comprising:

for each particular computer station:
   a switching element multiplexingly connectable to at least two specific ones of said communication devices;
   a filter connected to said switching element; and
   a communication interface connected between said particular computer station and said filter, said communication interface operative to receive from said particular computer station a request to connect said particular computer station to a requested one of said specific communication devices and operative to provide a connection command to said filter when said particular computer is configured according to said request,
   wherein said filter is operative to identify said connection command and to make said switching element connect only to said requested communication device, and wherein said filter and said communication interface are operative to provide data communication between said requested communication device and said particular computer station when said switching element is connected to said requested communication device.

2. The system according to claim 1, wherein said switching element disconnects said selected computer station from any communication device, before said connecting to said requested communication device.

3. System for securely connecting at least one computer station to a plurality of communication devices, the system comprising:

for each particular computer station:
a switching element multiplexingly connectable to at least two specific ones of said communication devices; and
a controller, connected to said switching element and said particular computer station, said controller operative to receive from said particular computer station a request to connect said particular computer station to a requested one of said specific communication devices and operative to provide a connection command to said switching element when said particular computer is configured according to said request,
whereby said switching element connects said requested communication device to said particular computer station upon receipt of said connection command.

4. System for securely connecting a predetermined number of computer stations to a plurality of communication devices via a predetermined number of communication lines, the predetermined number of communication lines being less than any one of the predetermined number of computer stations and the predetermined number of communication devices, the system comprising:

a remote switching device multiplexingly connectable to said communication devices; and
a local switching device connected to said computer stations and connectable to said remote switching device via said communication lines, said local switching device operative to receive a request from a particular one of said computer stations to connect said particular computer station to a requested one of said communication devices and operative to connect said particular computer station to said remote switching device via an available one of said communication lines,
wherein said remote switching element is operative to connect said available one of said communication lines to said requested communication device.

5. The system according to claim 4, wherein said local switching device connects said one of said computer stations to said remote switching device, via an available one of said communication lines, only when said one of said computer stations is configured according to said connection request.

6. The system according to claim 1, wherein each said at least two communication devices is selected from the group consisting of:
a printer;
a network interface;
a scanner;
a modem;
a switch;
a hub;
a router;
a computer peripheral device; and
a server.

7. The system according to claim 1, wherein said switching element is selected from the group consisting of:
a relay;
a packet switch;
a frequency based switch;
a code switch;
an optical switch;
an analog switch;
a biological switch;
a digital switch; and
a solid state switch.

8. The system according to claim 1, wherein said requested communication device determines a configuration for said computer station, to be detected as such in said computer station before connecting to said desired requested communication device.

9. Method for selectively connecting at least one computer station to a plurality of communication devices, the method comprising the steps of:
receiving a connection request from a selected one of said at least one computer station, to connect to a requested one of said plurality of communication devices;
detecting if said selected computer station is configured according to said requested communication device;
connecting said selected computer station to said requested communication device, when said selected computer station is configured according to said requested communication device.

10. The method according to claim 9, further comprising the step of disconnecting said selected computer station from all of said communication devices, before said step of connecting.

11. The system according to claim 3, wherein each said at least two communication devices is selected from the group consisting of:
a printer;
a network interface;
a scanner;
a modem;
a switch;
a hub;
a router;
a computer peripheral device; and
a server.

12. The system according to claim 3, wherein said switching element is selected from the group consisting of:
a relay;
a packet switch;
a frequency based switch;
a code switch;
an optical switch;
an analog switch;
a biological switch;
a digital switch; and
a solid state switch.

13. The system according to claim 3, wherein said requested communication device determines a configuration for said computer station, to be detected as such in said computer station before connecting to said desired requested communication device.

14. The system according to claim 4, wherein each said at least two communication devices is selected from the group consisting of:
a printer;
a network interface;
a scanner;
a modem;
a switch;
a hub;
a router;
a computer peripheral device; and
a server.

15. The system according to claim 5, wherein said requested communication device determines a configuration for said computer station, to be detected as such in said computer station before connecting to said desired requested communication device.

* * * * *